United States Patent
Berntorp et al.

(10) Patent No.: US 9,568,915 B1
(45) Date of Patent: Feb. 14, 2017

(54) SYSTEM AND METHOD FOR CONTROLLING AUTONOMOUS OR SEMI-AUTONOMOUS VEHICLE

(71) Applicant: Mitsubishi Electric Research Laboratories, Inc., Cambridge, MA (US)

(72) Inventors: Karl Berntorp, Watertown, MA (US); Stefano Di Cairano, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/041,639

(22) Filed: Feb. 11, 2016

(51) Int. Cl.
    *G01C 22/00* (2006.01)
    *G05D 1/00* (2006.01)

(52) U.S. Cl.
    CPC .................................. *G05D 1/0088* (2013.01)

(58) Field of Classification Search
    None
    See application file for complete search history.

(56) References Cited

U.S. PATENT DOCUMENTS

| | | |
|---|---|---|
| 7,447,593 B2 | 11/2008 | Estkowski et al. |
| 7,734,387 B1 | 6/2010 | Young et al. |
| 8,038,062 B2 | 10/2011 | Kenefic |
| 8,473,447 B2 | 6/2013 | Yoon et al. |
| 8,666,548 B2 | 3/2014 | Lim |
| 8,825,207 B2 | 9/2014 | Kim et al. |
| 2003/0191561 A1* | 10/2003 | Vos .......................... G05B 9/02 701/3 |
| 2014/0207325 A1 | 7/2014 | Mudalige et al. |
| 2014/0253722 A1* | 9/2014 | Smyth ....................... G01P 3/38 348/135 |

* cited by examiner

*Primary Examiner* — Adam Alharbi
(74) *Attorney, Agent, or Firm* — Gene Vinokur; James McAleenan; Hironori Tsukamoto

(57) ABSTRACT

A method controls a motion of a vehicle using a model of the motion of the vehicle that includes an uncertainty. The method samples a control space of possible control inputs to the model of the motion of the vehicle to produce a set of sampled control inputs and determines a probability of each sampled control input to move the vehicle into state satisfying constraints on the motion of the vehicle. The method determines, using the probabilities of the sampled control inputs, a control input having the probability to move the vehicle in the state above a threshold. The control input is mapped to a control command to at least one actuator of the vehicle to control the motion of the vehicle.

16 Claims, 26 Drawing Sheets

| Specifications on Computed Motions | |
|---|---|
| 400 | Stay on the road |
| 410 | Stay in the middle of the lane |
| 420 | Maintain nominal longitudinal velocity |
| 430 | Maintain safety margin to surrounding obstacles |
| 440 | Maintain minimum distance to vehicles in the same lane |
| 450 | Drive smoothly |

FIG. 4

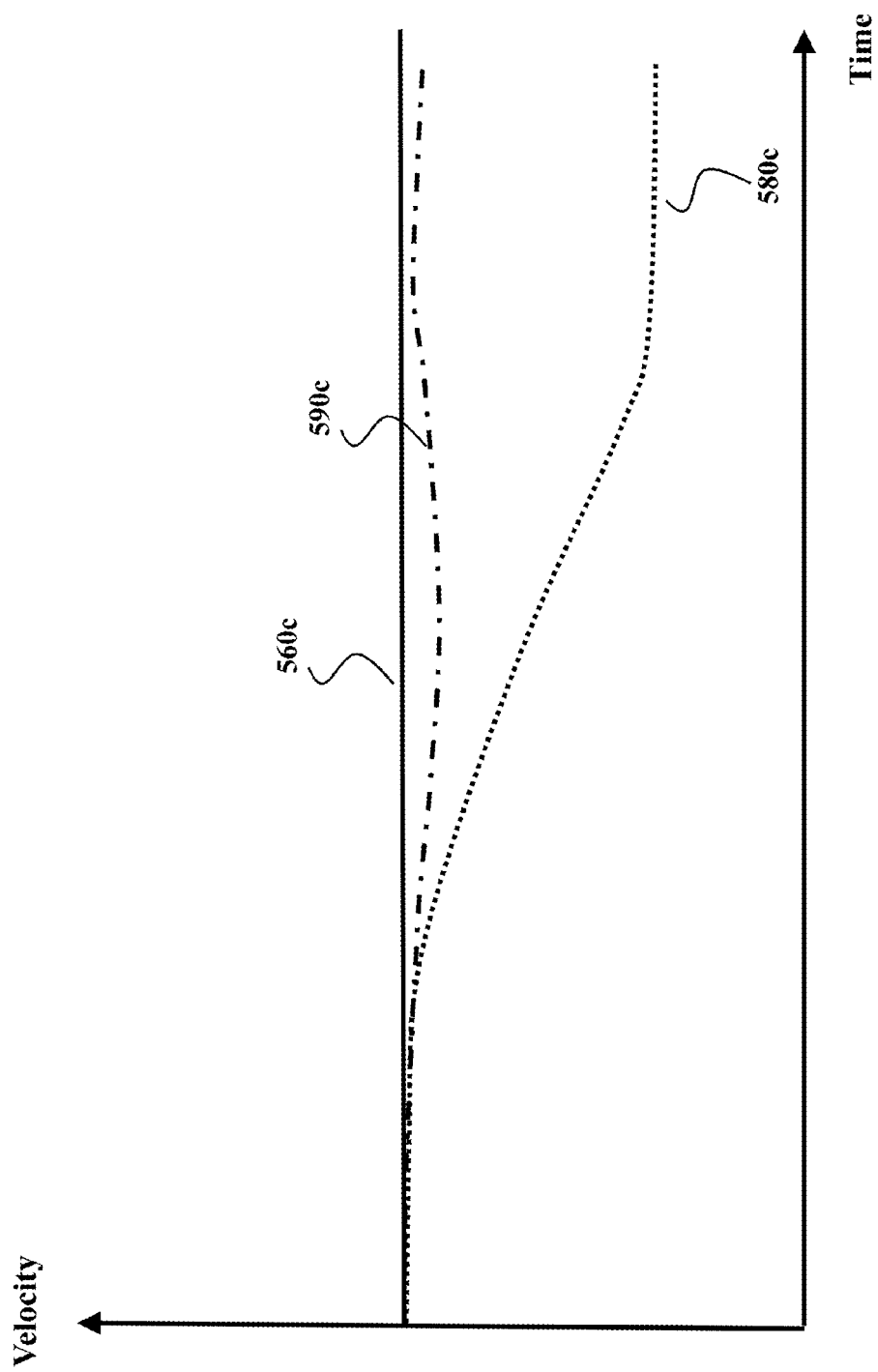

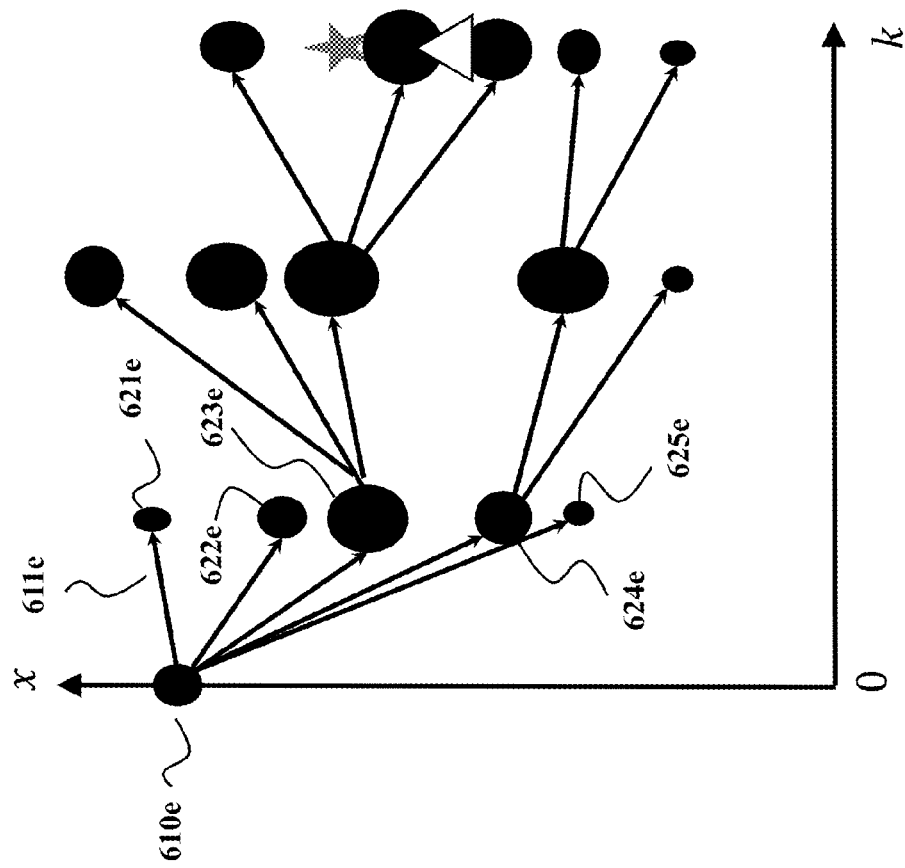

SYSTEM AND METHOD FOR CONTROLLING AUTONOMOUS OR SEMI-AUTONOMOUS VEHICLE

FIELD OF THE INVENTION

The present invention relates generally to controlling vehicles, and more particularly to controlling an autonomous or a semi-autonomous vehicle.

BACKGROUND OF THE INVENTION

Several control systems employed by vehicles, either autonomous vehicles or vehicles executing in autonomous-driving mode, predict future, safe motions of the vehicle toward some target state, both in order to avoid obstacles, such as other vehicles or pedestrians, but also to optimize some criteria associated to the operation of the vehicle. The target state can either be a fixed location, a moving location, a velocity vector, a region, or a combination thereof. The surroundings, such as road edges, pedestrians, and other vehicles, are sensed by the sensors of the vehicle and/or are at least partially known by a priori given information. However, the sensor information is noisy and uncertain, the exact parameters of the vehicle are unknown, and the environment is only partially known. The control of the vehicle should therefore account for such uncertainties.

For example, if an autonomous road vehicle travels along a road segment, the control system of the autonomous vehicle can generate a motion that minimizes one or combinations of deviations from the middle of the lane and speed variations to provide a smooth ride for the passenger and to provide a smooth traffic flow. The sensors of the vehicle detect potential obstacles on the road. The location and velocity of the obstacles are uncertain, due to sensing noise and other sources of uncertainty. The vehicle control system should take the uncertainty into account when computing suitable accelerations and steering input for the vehicle, and the corresponding resulting motion, to avoid unnecessary jumps in control inputs or other unwanted behaviors of the vehicle.

Since the models of the vehicle and the environment used by some control systems of the autonomous vehicle are only simplified mathematical descriptions of the real world, the predicted future motion must be computed fast, such that it can be updated in real time whenever necessary. Therefore, the motion needs to be computed recursively, either at a fixed update rate or whenever new sensor information arrives.

Several systems determine either the path U.S. Pat. No. 8,666,548 or the motion of the vehicle by generating random configurations or control inputs U.S. Pat. No. 7,447,593, US 88825207, and connect different random samples to each other, to grow a tree of possible motions. When only considering predictions of future paths, the computational complexity of the method is reduced, but it can result in a nondrivable path. On the other hand, when motions of the vehicle are predicted, the quality of the motion is determined by evaluating the entire motion. The result is either that the quality of the motions cannot be guaranteed in real-time operation, or that the motion the autonomous vehicle should follow is not determined sufficiently fast, or a combination of the both.

A cause of the lack of quality of motion in combination with computational/memory load is that the quality of the motion is determined by investigating the entire motion, from initial state to target state. Therefore, the tree of possible motions becomes unnecessarily large. In such a case, the computational/memory load can be overwhelming.

Fast computations and reliable performance are ubiquitous in several applications. For example, consider a situation when a road-bound autonomous vehicle travels on a highway and a future motion cannot be found. The predicted motion should not only be safe, but it should also be computed by considering different situations. For example, consider a scenario where the vehicle operates on a road with two lanes and there are two other vehicles present; one in front of the car and one vehicle approaching from behind in the other lane. In such a scenario, the motion must be determined by deciding whether to slow down, stay behind, or initiate overtaking.

SUMMARY OF THE INVENTION

Some embodiments of the invention are based on the realization that the quality of the determined motion of the vehicle can be achieved by evaluating the quality of the control input taking the vehicle from one state to another, instead of evaluating the entire motion, where a state of the vehicle includes dynamics of the vehicle, such as locations, velocities and headings of the vehicles. For example, if it is desired that the autonomous vehicle initiates a lane change with maintained velocity, some embodiments of the invention determine control inputs resulting in a state that both change lane and maintain velocity. The characteristics of a desired state can be defined beforehand, or be adjusted depending on the behavior and characteristics of the environment.

Some embodiments of the invention rely on that a state and corresponding control inputs leading up to that state can be determined using a model of the motion of the vehicle and obstacles in the environment in which the vehicle operates. For example, control inputs that pose a high risk of in the future causing a collision with an obstacle are assigned low, or zero, probability.

Accordingly, one embodiment discloses a method for controlling a motion of a vehicle. The method includes sampling a control space of possible control inputs to a model of the motion of the vehicle to produce a set of sampled control inputs, wherein the model of the motion of the vehicle includes an uncertainty; determining, using the model of the motion of the vehicle, a probability of each sampled control input to move the vehicle into a state satisfying constraints on the motion of the vehicle; determining, using the probabilities of the sampled control inputs, a control input having the probability to move the vehicle in the state above a threshold; mapping the control input to a control command to at least one actuator of the vehicle; and controlling the motion of the vehicle according to the control command. The steps of the method are performed using a processor of the vehicle.

Another embodiment discloses a control system of a vehicle including a vehicle controller and a motion-planning system including a processor and a memory storing a model of the motion of the vehicle that includes an uncertainty of the motion and constraints on the motion of the vehicle. The motion-planning system samples a control space of possible control inputs to the model of the motion of the vehicle to produce a set of sampled control inputs; determines, using the model of the motion of the vehicle, a probability of each sampled control input to move the vehicle into a state satisfying constraints on the motion of the vehicle; and determines, using the probabilities of the sampled control inputs, a control input having the probability above a threshold. The vehicle controller maps the control input to a control command to at least one actuator of the vehicle and controls the motion of the vehicle using the control command to the actuator of the vehicle.

BRIEF DESCRIPTION OF THE DRAWINGS

FIG. 4 is a table showing possible specifications on the motion according to some embodiments of the invention;

FIG. 5C is a schematic of different velocities determined according to some principles employed by some embodiments of the invention;

FIG. 6H shows a simplified schematic of iteration of the method for situations of FIG. 6G according to some embodiments of the invention;

DETAILED DESCRIPTION OF THE PREFERRED EMBODIMENTS

Some embodiments of the invention are based on the realization that the quality of the motion of the vehicle can be achieved by evaluating the quality of the control input taking the vehicle from one state to another state, instead of evaluating the entire motion from the current state to target state. As used herein, the state of the vehicle includes dynamics of the vehicle, such as locations, velocities, and headings of the vehicles.

Figure 1A:
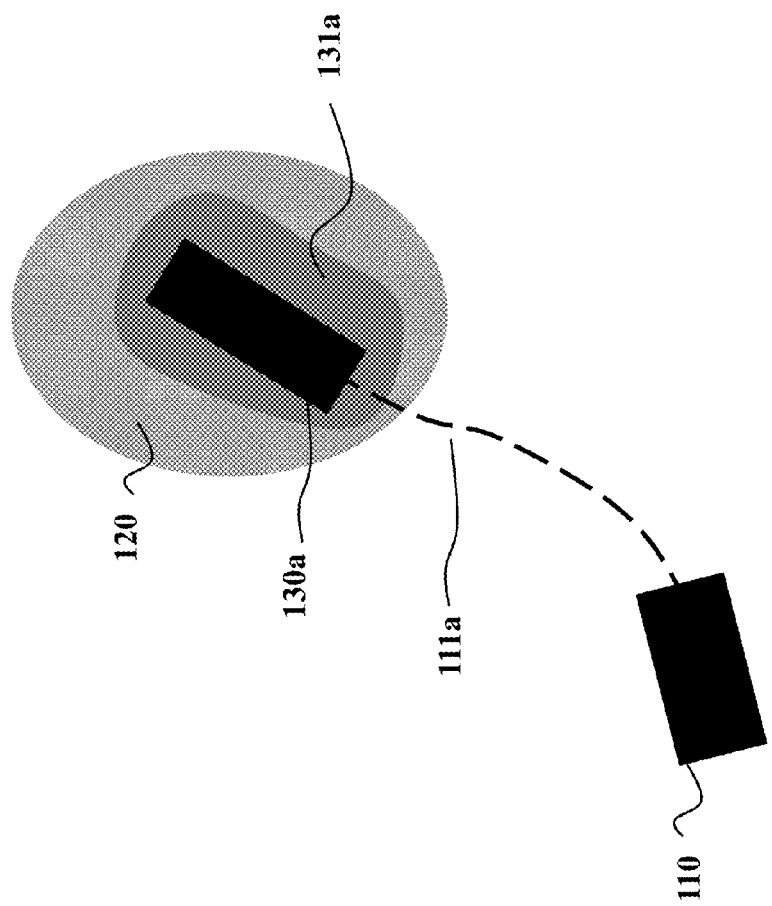
FIG. 1A is a schematic illustrating a suitable control input according to some embodiments of the invention.

FIG. 1A shows an example of an initial state of an autonomous vehicle 110 and a next state 120. The next state 120 can be a Cartesian position, a velocity, or another entity associated with the vehicle. The next state 120 can be a specific state, or a region of states. For example, the next state 120 can be an interval of allowed velocities or a region of possible locations in Cartesian space. A suitable control input is an input that takes the vehicle 110 from its initial state to next state 120. The resulting state 130a from an input can correspond to a state transition resulting in applying a control input for one time step, or the resulting state 130a can be connected with the initial state 110 with a trajectory 111a, that is, a sequence of state transitions.

The transition from the initial state to the next state can be performed using a model of the motion of the vehicle. The model of the motion transitions the states of the vehicle according to a control input submitted to the model. In various embodiments, the model of the motion of the vehicle includes an uncertainty. To that end, the model of the motion of the vehicle is a probabilistic motion model, in order to account for that the model is a simplified description of the actual motion of the vehicle, but also to account for uncertainty in sensing of the true state of the vehicle, uncertainty in sensing of the state of obstacles, and uncertainty in sensing of the environment.

FIG. 1A shows the next state 130a resulting from a particular choice of control input and the uncertainty region 131a associated with the uncertainty of moving to the next state due to the uncertainty of the model. Because the probabilistic model includes the uncertainty, the region 131a is bigger than the next state 130a, i.e., the region 131a includes the next state 130a. The next state 130a ends in a state 120 that satisfies constraints on the motion of the vehicle, the control input is a good control input. As used herein, the "goodness" or quality of each control input depends on a probability of the control input to move the vehicle into state satisfying constraints on the motion of the vehicle. The higher the probability, the better the control input.

Figure 1B:
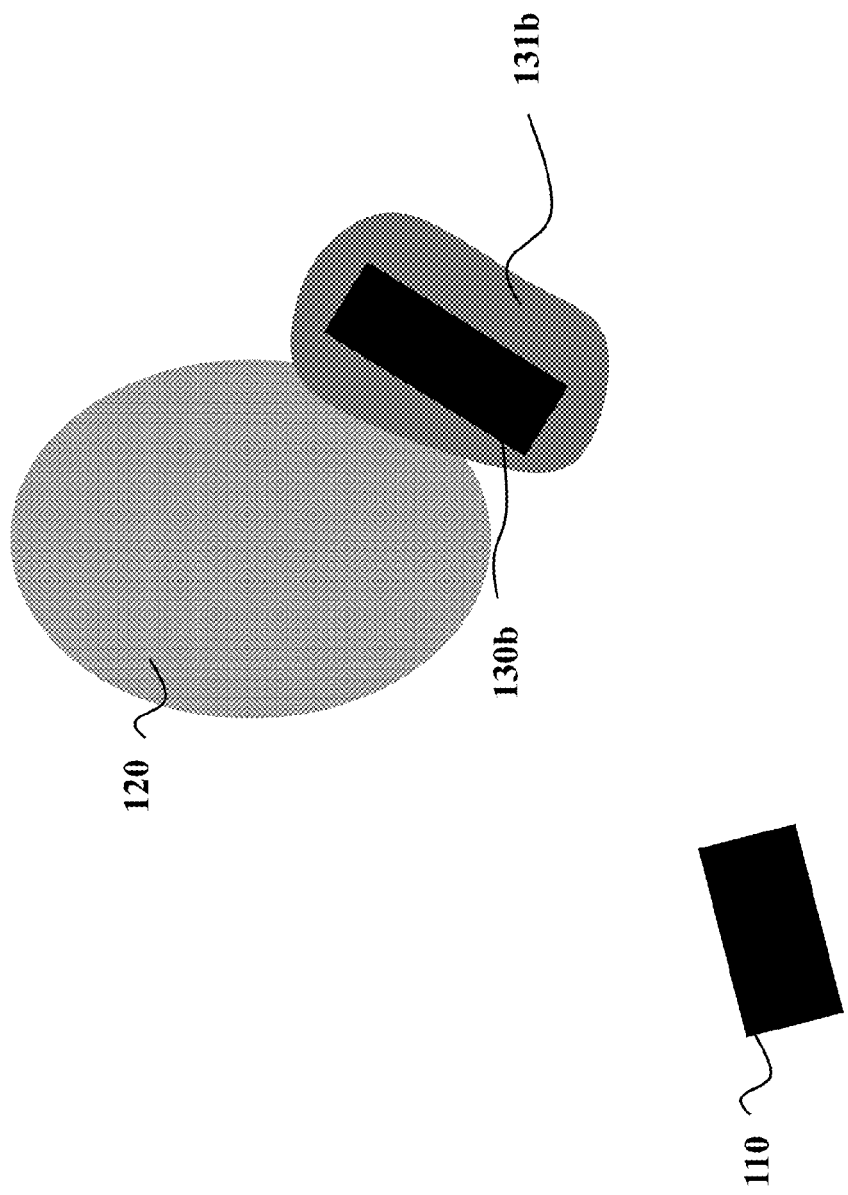
FIG. 1B is a schematic illustrating a control input with some probability of being suitable, according to some embodiments of the invention.

FIG. 1B shows the next state 130b and corresponding uncertainty region 131b for another choice of control input. The next state of the vehicle cannot violate the constraints on the motion. However, there are some states like 130b within the uncertainty region 131b that can satisfy the constraints, so there is some probability that the control input of example of the FIG. 1B transitions the states of the vehicle from the initial state 130 is a good control input.

Figure 1C:
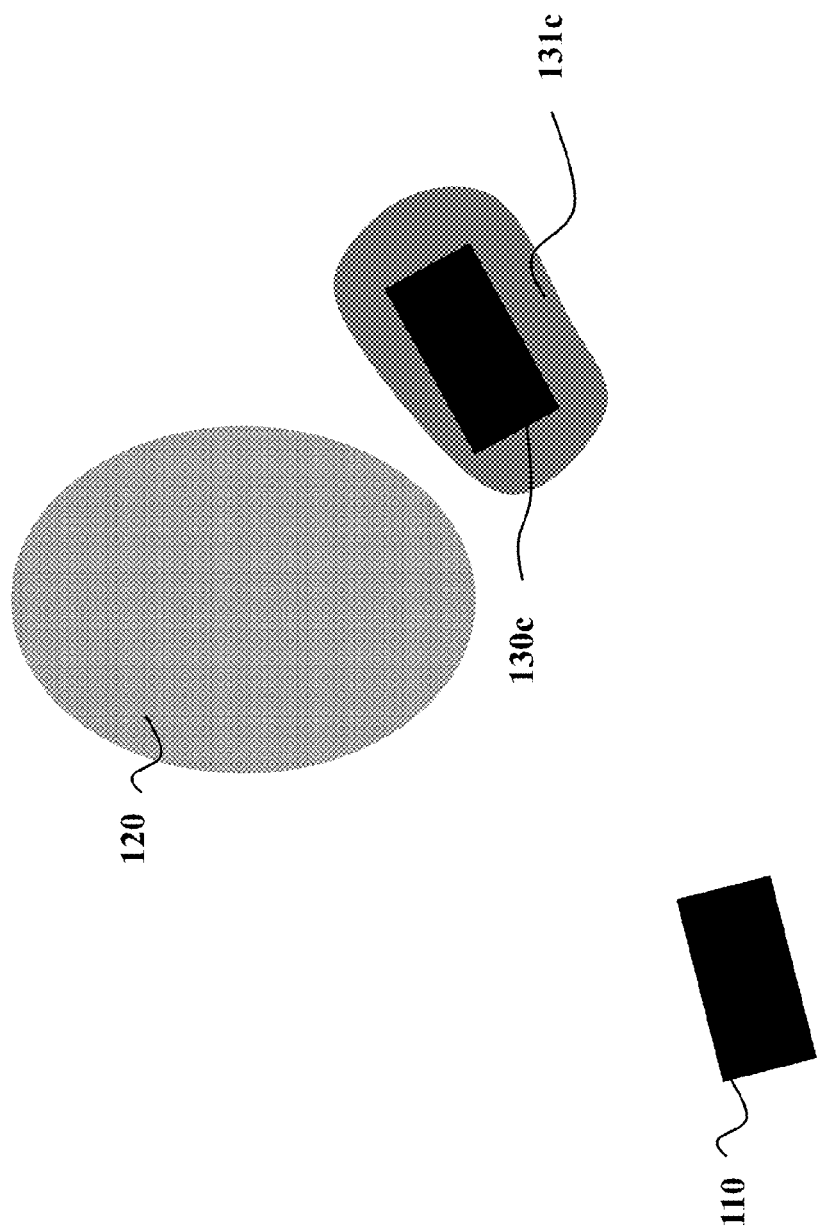
FIG. 1C is a schematic illustrating an unsuitable control input according to some embodiments of the invention.

FIG. 1C shows a situation where a control input leads to a next state 130c with uncertainty region not intersecting with the desired state 120. The probability that the control input of example of the FIG. 1C transitions the states of the vehicle from the initial state 130 to a state satisfying the constraint on the motion of the vehicle is close to zero.

In one embodiment, the threshold is determined a priori by a fixed value, e.g., 80%. In another embodiment, the threshold is dependent on the environment of the vehicle. For example, in an environment with several obstacles nearby, if the threshold is set so to almost surely avoid obstacles, it might not be possible to move the vehicle into an arbitrarily good state within the predetermined computation time. In those embodiments, the threshold value is reduced. In another embodiment of the invention, it is predicted that motions satisfying, with high probability, the constraints can be determined. In that embodiment, the threshold value is increased.

Figure 1D:
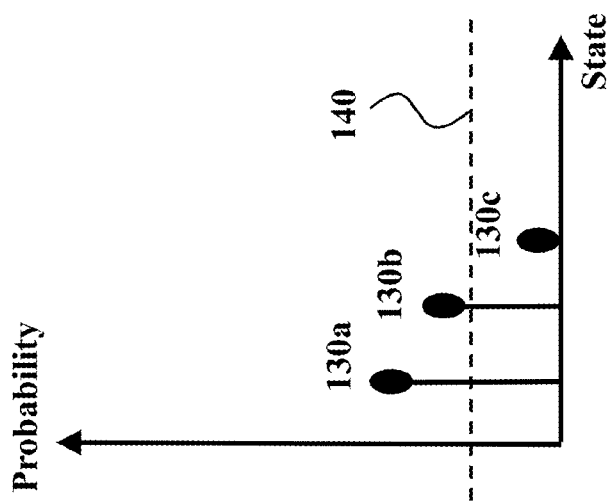
FIG. 1D is a schematic illustrating probabilities to various control inputs according to some embodiments of the invention.

FIG. 1D shows possible assigned probabilities to each control input and corresponding state 130a, 130b, and 130c. As can be seen, the probability of the control input of FIG. 1A to move the vehicle into the state satisfying constraints is the highest among the control inputs of FIGS. 1A, 1B and 1C. Similarly, the probability of the control input of FIG. 1B to move the vehicle into the state satisfying constraints is higher than the probability of the control input of FIG. 1C. Some embodiments determine, using the probabilities of the sampled control inputs, a control input having the probability to move the vehicle in the state above a threshold 140.

For example, one embodiment of the invention, uses the control input corresponding to the control input with the highest probability above the threshold, i.e., the control input corresponding to the state 130a. Another embodiment determines the control input as a weighted average function of the control inputs, such as control inputs of FIGS. 1A, 1B, and 1C. For example, the weight for each control input in the weighted average function is its corresponding probability. In some implementations, the embodiment aggregates the sampled control inputs having the probability above the threshold, i.e., the control inputs of FIGS. 1A and 1B.

Figure 1E:
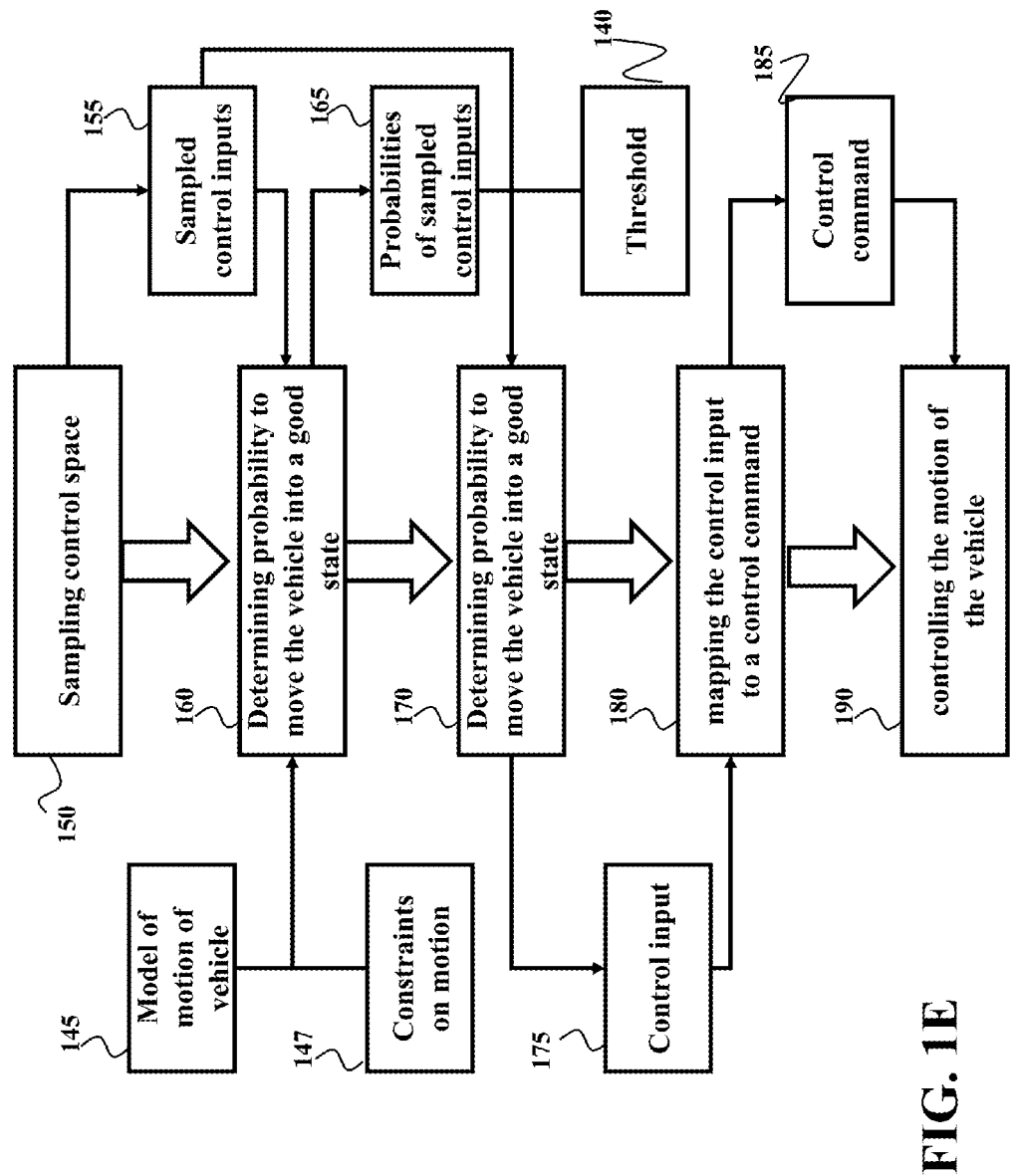
FIG. 1E is a block diagram of a method for controlling a motion of a vehicle according to one embodiment of the invention.

FIG. 1E shows a block diagram of a method for controlling a motion of a vehicle according to one embodiment of the invention. The method can be implemented using a processor of the vehicle. The method samples 150 a control space of possible control inputs to a model of the motion of the vehicle to produce a set of sampled control inputs 155. The model 145 of the motion of the vehicle includes an uncertainty on the motion of the vehicle. The method determines 160, using the model 145 of the motion of the vehicle, a probability 165 of each sampled control input to move the vehicle into a state satisfying constraints 147 on the motion of the vehicle.

Next, the method determines 170, using the probabilities 165 of the sampled control inputs, a control input 175 having the probability to move the vehicle in the state above a threshold 140. The method maps 180 the control input 175 to a control command 185 to at least one actuator of the vehicle and controls 190 the motion of the vehicle according to the control command.

Figure 2A:
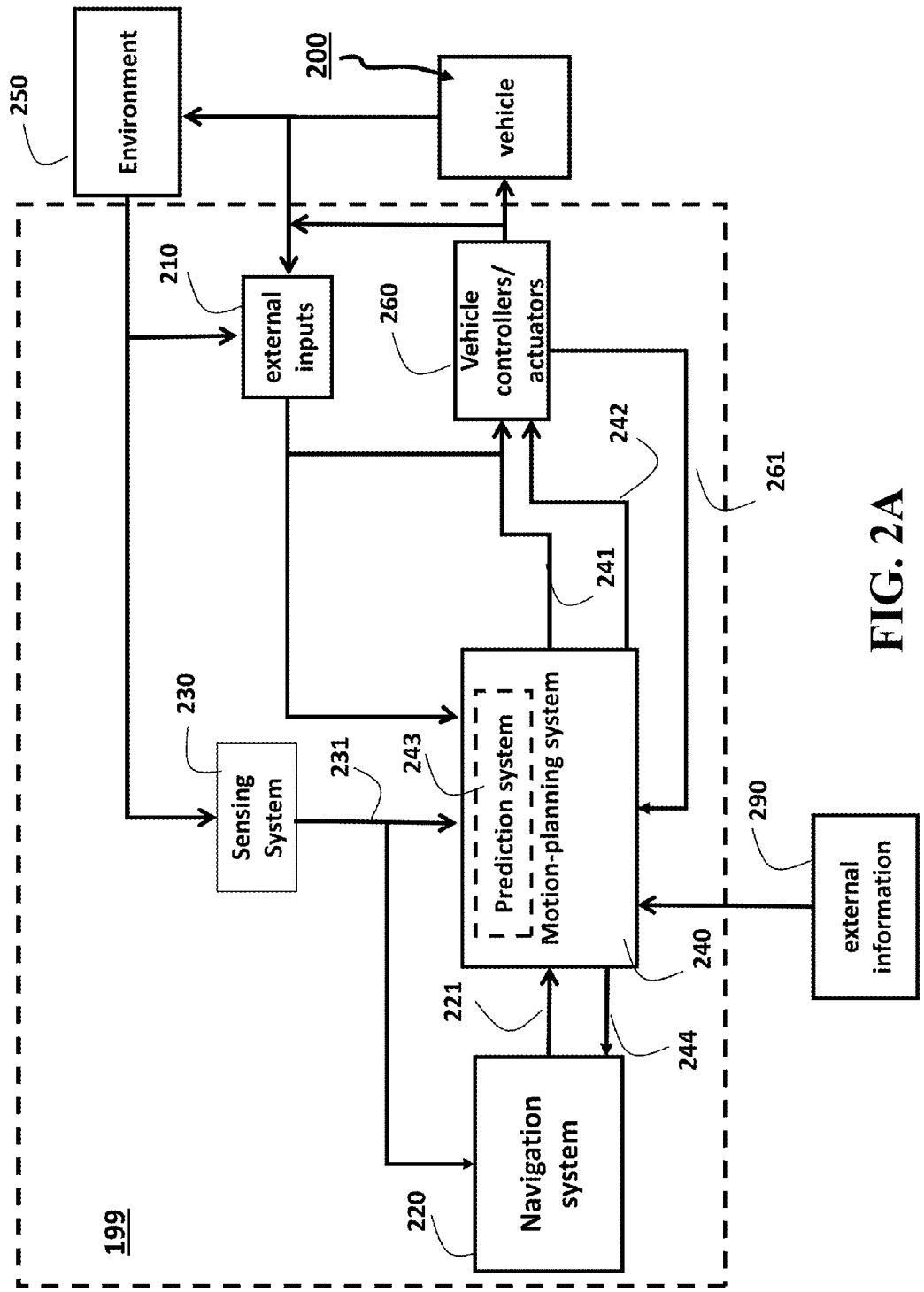
FIG. 2A is a block diagram of a control system for controlling a vehicle according to some embodiments of the intervention.

FIG. 2A shows a block diagram of a control system 199 for controlling a vehicle 200 according to some embodiments of the invention. The vehicle can be any type of moving vehicle equipped with an autonomous system, such as a four-wheeled passenger car or a mobile robot. The vehicle can also receive external inputs 210 overriding the commands of the control system 199. In such a case the vehicle is a semi-autonomous vehicle.

The control system 199 includes a navigation system 220 for determining a current state and a target state and/or region of the vehicle. For example, the navigation system 220 can include global positioning system (GPS) and/or an inertial measurement unit (IMU). For example, the IMU can comprise 3-axis accelerometer(s), 3-axis gyroscope(s), and/or magnetometer(s). The IMU can provide velocity, orientation, and/or other position related information to other components of the control system 199.

The control system 199 also includes a motion-planning system 240 for determining the control input and/or a sequence of control inputs corresponding to the future motion of the vehicle. In some embodiments of the invention, the motion-planning system iteratively determines control inputs and states of the vehicle from a state of the vehicle determined during previous iterations.

For example, an initial state can be the current location as determined by the GPS, or as a combination of the current location and the current velocity, determined by combinations of GPS and IMU. The target state can be determined in response to information 244 from the motion-planning system 240, predicting 243 the motion of obstacles, obtained from sensing information 231 from a sensing system 230, including at least one sensor for detecting an obstacle location and velocity. For example, the target location can be a location avoiding a collision with the obstacle.

In one embodiment, the motion-planning system determines the future motion of the vehicle, using a probabilistic motion model of the vehicle, that with highest probability satisfies various constraints on the motion of the vehicle, such as a bound on a deviation of a location of the vehicle from a middle of a road, a bound on a change from a current acceleration and a heading angle of the vehicle, a bound on a deviation from a desired velocity profile of the vehicle, and a minimal distance to an obstacle on the road.

In addition to the initial and the target states, the motion-planning system 240 receives information 231 about the surroundings 250, such as obstacles, drivable, nondrivable, or illegal areas, for the vehicle. The information 231 can be received from the sensors 230, or as external information 290, for example, using vehicle-to-vehicle or vehicle-to-infrastructure communication. The information about the environment can be represented as a map. The motion-planning system 240 can also receive information 261 about the vehicle motion from the vehicle-control units 260. The information can include a state of the vehicle, such as position, heading, velocity, and is received either from hardware or software, connected directly or remotely to the machine.

The motion-planning system 240 determines the motion 241 for the vehicle, which reaches the target state and avoids collision and nondrivable areas, while satisfying constrains on the motion of the vehicle. The motion at least includes a path, velocity, and orientation/heading, but can also include further entities, such as rotational velocities, accelerations, and steering, brake, and engine torques. In addition, the motion-planning system 240 determines the control inputs 242 corresponding to the motion 241, which can be used as feedforward control inputs to the vehicle-control system that maps the control inputs to the control commands to the actuators of the vehicle.

In one embodiment of the invention, the motion-planning system includes predictions 243 of motions of obstacles, detected by the sensing system 230 and received 231 by the motion planner. In response to predicting an obstacle on the future predicted motion of the vehicle with high probability, some embodiments of the invention compute a modified future motion of the vehicle. An obstacle can be another vehicle or a pedestrian, or a virtual obstacle representing illegal driving behavior, such as the line delimiting the allowed driving lane, a stop line, a yield sign, or from inputs from a driver or passenger.

For example, the computed motions are searched for intersection with the obstacle such that a collision can occur, and one embodiment assigns a low probability, or even discards, those that are predicted to collide with the obstacle. The modified future motion is determined starting from the remaining stored set of possible motions, computed from previous iterations. Some of the embodiments of the invention are based on that the sensor information 231 obtained from the sensing system 230 can be uncertain and with errors, and that predictions of obstacle motion are uncertain, even when the obstacle prediction 243 accounts for uncertainties. In such a case, when corrected information is received from the sensor system 230, the motion computed by the motion-planning system 240 is modified as when detecting an obstacle on the path.

The motion 241 is used as an input, or reference trajectory, to the vehicle controllers 260 to compute vehicle commands, such as steering, brake, and throttle. Those commands are submitted to the actuators of the vehicle to move the vehicle according to the predicted motion 241. Another embodiment provides the control inputs 242 corresponding to the motion 241. If the motion model of the vehicle contained in the motion planner 240 uses the same control inputs as the actual vehicle, the vehicle can be controlled directly using the computed inputs. For example, if the vehicle 200 is controlled by applying steering and engine torque, and if the motion model used in the motion planner also uses steering and engine torque as control inputs, these can be applied directly to the vehicle, thereby overriding the vehicle-control system 260. However, because the mathematical description of the vehicle 200 used in the motion planner 240 can be a simplification of the true motion of the vehicle, the control inputs 242 can instead be used as feedforward, or nominal, control signals together with motion references 241 as inputs to the vehicle-control system 260. For example, accelerations can be modeled to be proportional to the engine torque. Hence, if accelerations are used as inputs in the motion model of the vehicle employed in the motion-planning system 240, the accelerations can be used as scaled feedforward inputs to the vehicle-control system 260.

For example, the vehicle-control system 260 can include a steering controller, a brake controller and a throttle controller, wherein the steering controller takes a steering angle as input, the brake controller takes a reference deceleration or wheel slip as input, the engine controller takes a nominal velocity or acceleration as input, all controllers output torques, and the motion-planning system 240 includes all of these entities. Then, the torques computed by the motion planner 240 can either circumvent the vehicle-control system 260, or the torques 242 can be used as zero-level values of the vehicle-control system 260, and the steering angle, the reference deceleration or wheel slip, and the nominal velocity or acceleration can be used as references 241 to the vehicle-control system 260.

Figure 2B:
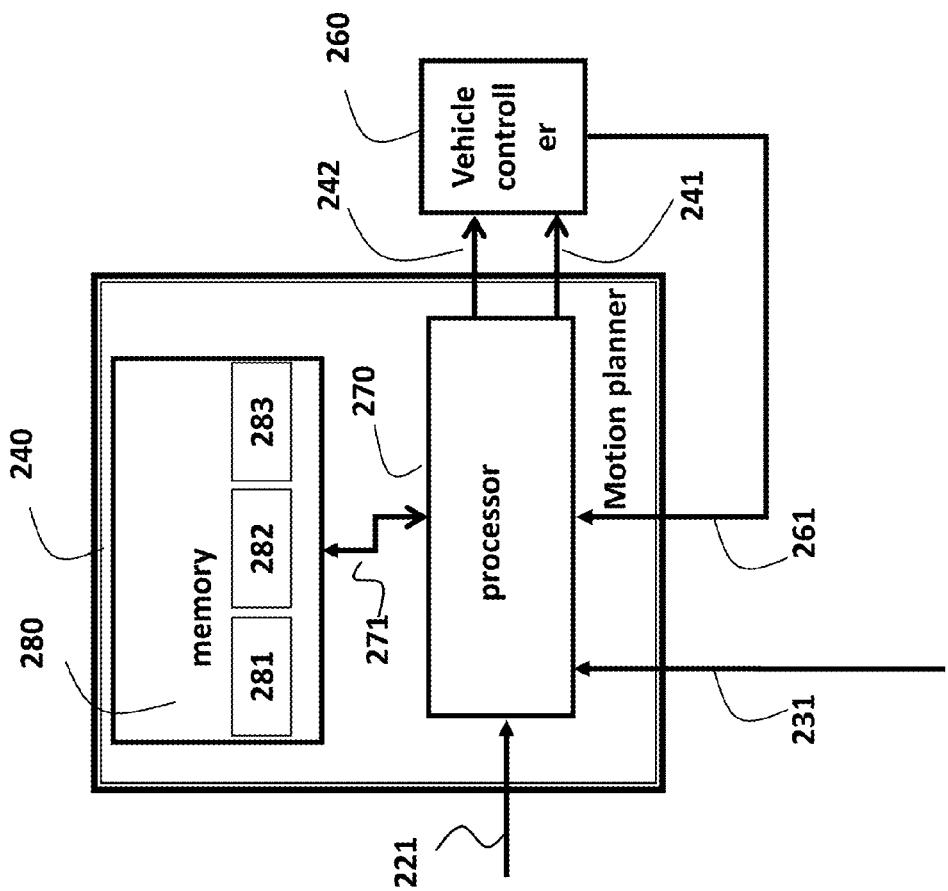
FIG. 2B is a diagram of a general structure of a motion-planning system according to one embodiment of the invention.

FIG. 2B shows a general structure of the motion-planning system 240 according to one embodiment of the invention. The motion-planning system 240 includes at least one processor 270 for executing modules of the motion-planning system 240. The processor 270 is connected 271 to a memory 280 that stores the map 281 of the environment and the vehicle information 282. The memory 280 also stores 283 the future motions computed up to the current time, the respective probabilities and uncertainties, and the internal information of the motion planner, including, but not limited to, cost function, values of each computed state, the motion leading up to each state, information about deviations from the desired location of the vehicle, and future predicted motions of obstacles. In some embodiments, the information on the vehicle and the environment are updated 271 based on information received from the vehicle 261 and the sensing 231.

One embodiment relies on the realization that desired control inputs can be determined only by evaluating the control inputs one at a time, instead of evaluating control inputs for an entire motion from initial state to target state. That is, the quality of a computed trajectory can be determined when evaluating a particular control input, rather than computing a trajectory from initial state to target state, and then evaluate the quality of the motion.

For example, some embodiments use a probabilistic motion model of the vehicle, computing control inputs optimizing a cost function on the motion of the vehicle, where the cost function is expressed as probabilistic constraints on the motion of the vehicle, wherein the selection of the set of control inputs can be selected according to optimizing some other probabilistic cost function. The cost functions are selected according to other embodiments of the invention.

Figure 3:
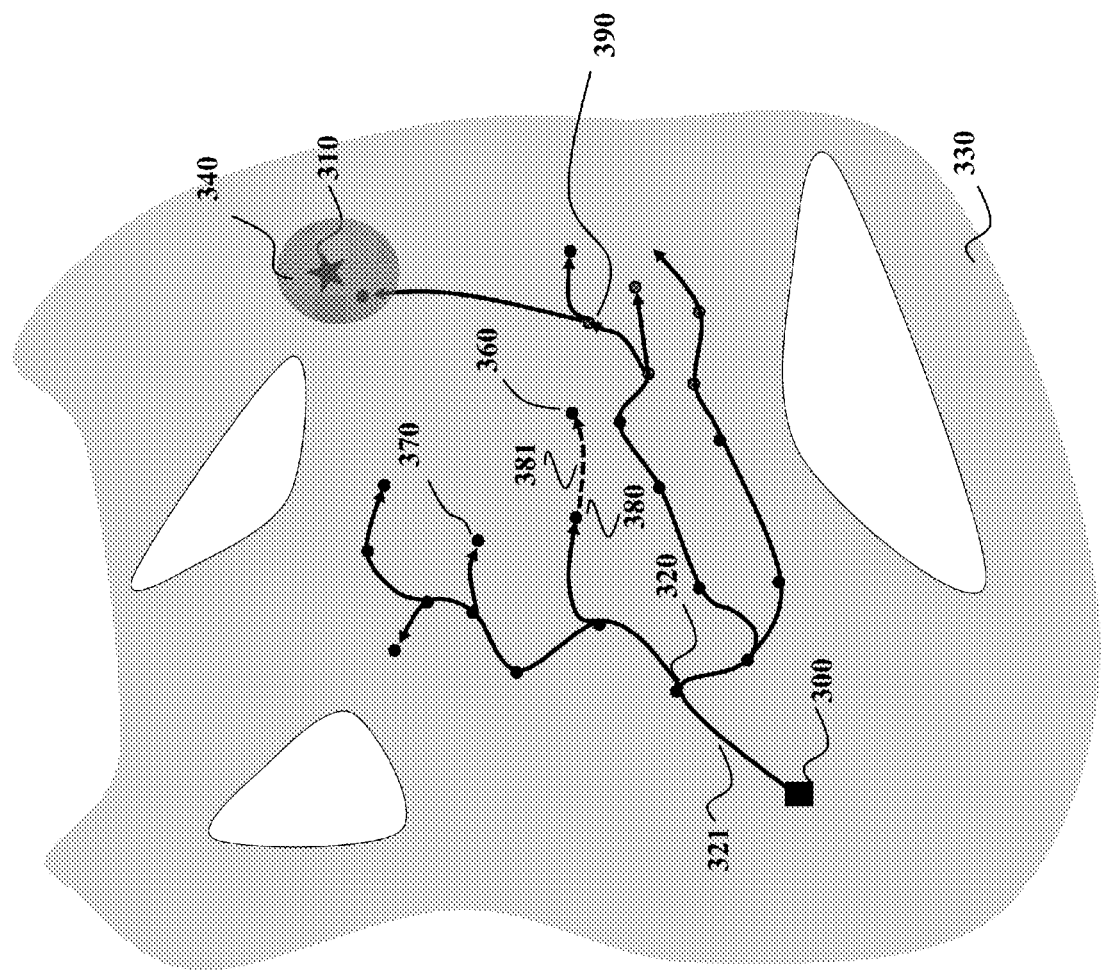
FIG. 3 is a schematic of a graph of state transitions defining the motion of the vehicle according to some embodiments of the invention.

FIG. 3 shows a schematic of a tree of state transitions defining the motion of the vehicle according to some embodiments of the invention. The current tree in the drivable space 330 is shown with root node 300 indicating the current state of the vehicle and includes the states as nodes and the state transitions as edges in state space, arising from control inputs chosen according to other embodiments of the invention. For example, edge 321 is the motion generated by applying a control input for a predefined time from root node 300 to state 320. The tree can include a target state 310 and target region 340 of the vehicle. In one embodiment of the invention, there can be several target states 310 and regions 340. A probability can be associated to the control input generating edge 321 and therefore also state 320, which accounts for uncertainties in the models of the vehicle, obstacles, and the environment.

In some embodiments of the invention, the edges 321 are created by evaluating a control input over several time instants, whereas other embodiments determine a new control input for each time instant, where the determination of control inputs are described according to other embodiments of the inventions. In other embodiments, the edges 321 are created by aggregating several control inputs over one or several time instants. In expanding the tree toward the target region 340, an initial state is selected, a control input is determined, and a corresponding state sequence and final state is determined. For example, 380 can be the selected state, 381 can be the trajectory, which is added as an edge to the tree, and 360 is the final state, added as a node to the tree. The updating of the tree is described by other embodiments of the invention.

In some embodiments, the vehicle state evolves dynamically in time according to some nonlinear function $x_{k+1}=f(x_k, u_k, w_k)$, where $f \in R^n$ is a nonlinear function describing the evolution of the system state, k is the discrete time index, $x \in X \in R^n$, where X is the state space, $u_k$ contains the inputs to the system, and $w_k$ is noise acting on the state of the system, for example, due to uncertainties in the mathematical description of the vehicle, uncertainties in the parameters of the vehicle, such as mass, or other sources of uncertainty. For example, the noise acting on the state includes one or combination of an uncertainty on accuracy of a dynamics of the vehicle described by the function and an uncertainty on accuracy of parameters of the vehicle used by the function. In some embodiments, the state includes a location vector, a velocity vector, and a heading, such as an orientation, of the vehicle. In terms of a probability density function (PDF), the dynamical system can be described as $x_{k+1} \sim p(x_{k+1}|x_k, u_k)$. Some embodiments rely on the realization that prior specifications on the desired motion can be determined.

FIG. 4 illustrates an exemplar list of possible specifications on the motion of an autonomous vehicle driving on roads. The specifications on the motion can be mapped to the constraints on the motion of the vehicle. For example, the specifications on the motion the vehicle can mandate the vehicle to stay on the road 400. Possible additional specifications can mandate that the vehicle should drive in the middle of the lane 410 with a nominal velocity 420. A nominal velocity can be given by road speed limits, obtained from a map or sensed by a sensing system 230, or it can be given by a driver or passenger 210 of the vehicle 200. For example, the specifications can also mandate the vehicle to maintain safety margin to surrounding obstacles. Surrounding obstacles can be detected by the sensing system 230 and the future behavior of the obstacles can be predicted by the prediction system 243. In addition, another possible specification is to maintain safety distance to vehicles in the same lane 440, which can be, but in general are not, the same as 430. For reasons of passenger comfort, fuel consumption, wear-and-tear, or other reasons, the specification can mandate a smooth drive 450 of the vehicle. Specifications, as tabulated in FIG. 4, can be counteracting each other, for example, it can be impossible to maintain constant velocity 420 while keeping a safety margin 430 to surrounding obstacles, or the specification 410 only states that the vehicle should maintain the middle of one of several lanes.

In some embodiments of the invention, the specifications are described as desired outputs, or constraints on the motion, $y_k=h(x_k)$, which the dynamical system should satisfy. For example, if one specification is the nominal velocity $v_{nom}$ and one state is the velocity of the vehicle v, then ideally $v_{nom}=v$, that is, the velocity of the vehicle should be the same as the nominal velocity.

In one embodiment, a random noise source $e_k$ is added to the desired outputs, that is, $y_k=h(x_k, e_k)$. The noise source $e_k$ accounts for that the specification might not be, and probably is not, possible to satisfy exactly. The noise source can be chosen in several ways. For example, the noise source can be chosen as an additive Gaussian PDF with zero mean and covariance matrix $R_k$, that is, $e_k \sim N(0, R_k)$, resulting in $y_k=h(x_k)+e_k$, or as a uniform distribution with minimum and maximum values, or as a multiplicative noise. Additionally or alternatively, the noise source can be chosen in application-specific ways. In terms of a PDF, the specifications can be described as $y_k \sim p(y_k|x_k)$.

To that end, in one embodiment of the invention, the constraints on the motion of the vehicle include one or combination of a bound on a deviation of a location of the vehicle from a middle of a road, a bound on a change from a current acceleration and a heading angle of the vehicle, a bound on a deviation from a desired velocity profile of the vehicle, and a bound on a minimal distance to an obstacle on the road. Additionally or alternatively, the constraints on the motion of the vehicle can be probabilistic and include one or combination of a probability of a deviation of a location of the vehicle from a middle of a road, a probability of a deviation from a current acceleration and a heading angle of the vehicle, a probability on a deviation from a desired velocity profile of the vehicle, a probability on violating a minimal distance to an obstacle on the road.

Figure 5A:
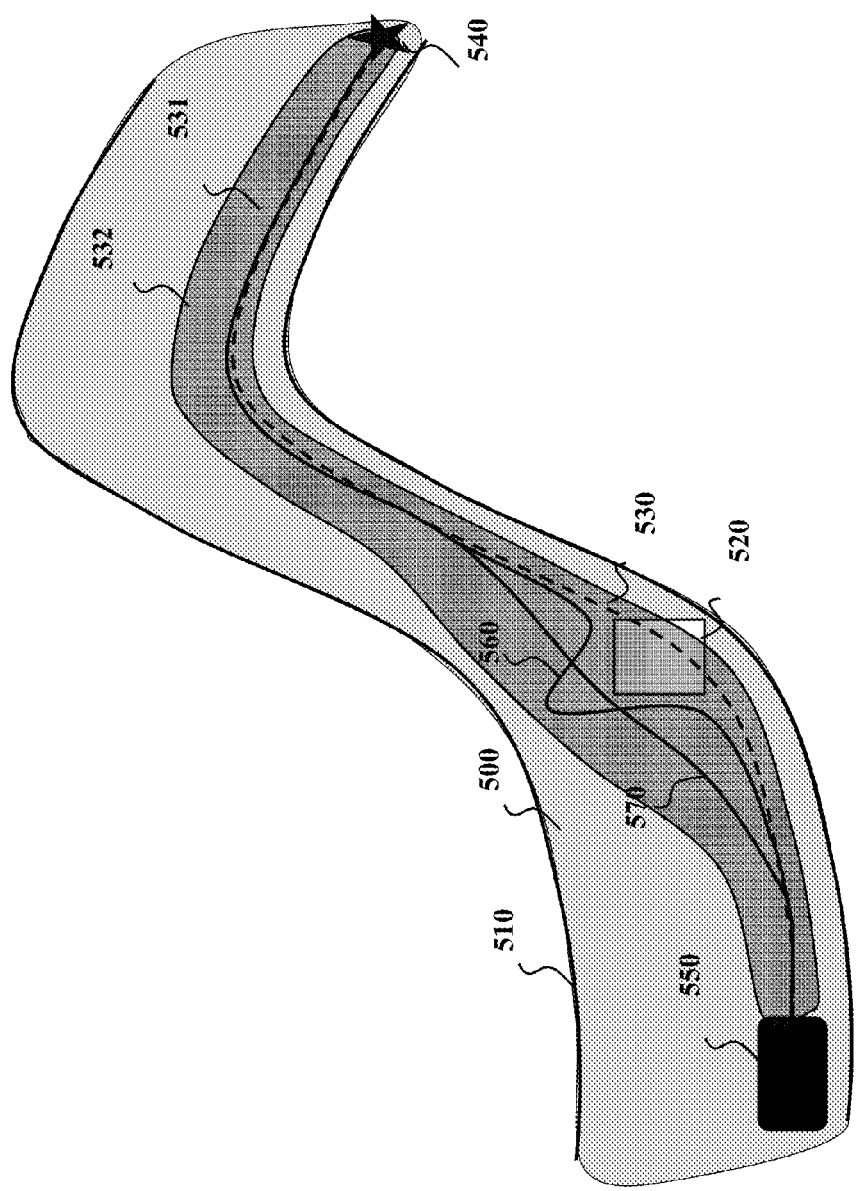
FIG. 5A is a schematic of different motions determined according to some principles employed by some embodiments of the invention.

FIG. 5A shows a schematic of different motions determined according to some principles employed by various embodiments of the invention. The drivable area 500 includes the road 510 except for the area 520 where an obstacle is present. The desired motion 530, which can be determined from lane information, the intents of a driver, or a passenger of the vehicle, can be interpreted as the reference motion that reaches the target state 540 from the current state 550 of the vehicle, but goes through the nondrivable area of the obstruction 520. The desired motion 530 can be modeled as a probabilistic constraint in the form of a probability density function (PDF) 531 over the state of the vehicle, where the desired motion 530 is the mean of the PDF and the allowed deviation from the mean is modeled as a standard deviation 532. In such a case, motions are given different probabilities depending on how much they intersect with the PDF 531. The motion planner generates the motion, such as motions 560 and 570, which avoid the obstacle 520 but starts and end at the same positions as the desired motion 530.

In some of the embodiments of the invention, the motion is computed by; first determining several motions from initial state to target state according to the probabilities of being a good motion; second, optimizing a deterministic cost function that combines deviations from a nominal motion and other measures of performance, for example, deviations from a nominal velocity, distance to surrounding obstacles, or the magnitude of steering input. To illustrate, the motion 560 stays close to the desired motion, whereas motion 570 signifies the importance of maintaining small steering inputs. In the motion-planning system 240, several different motions that lead to the target state 540 are computed, and the cost function determines which motion to select.

Figure 5B:
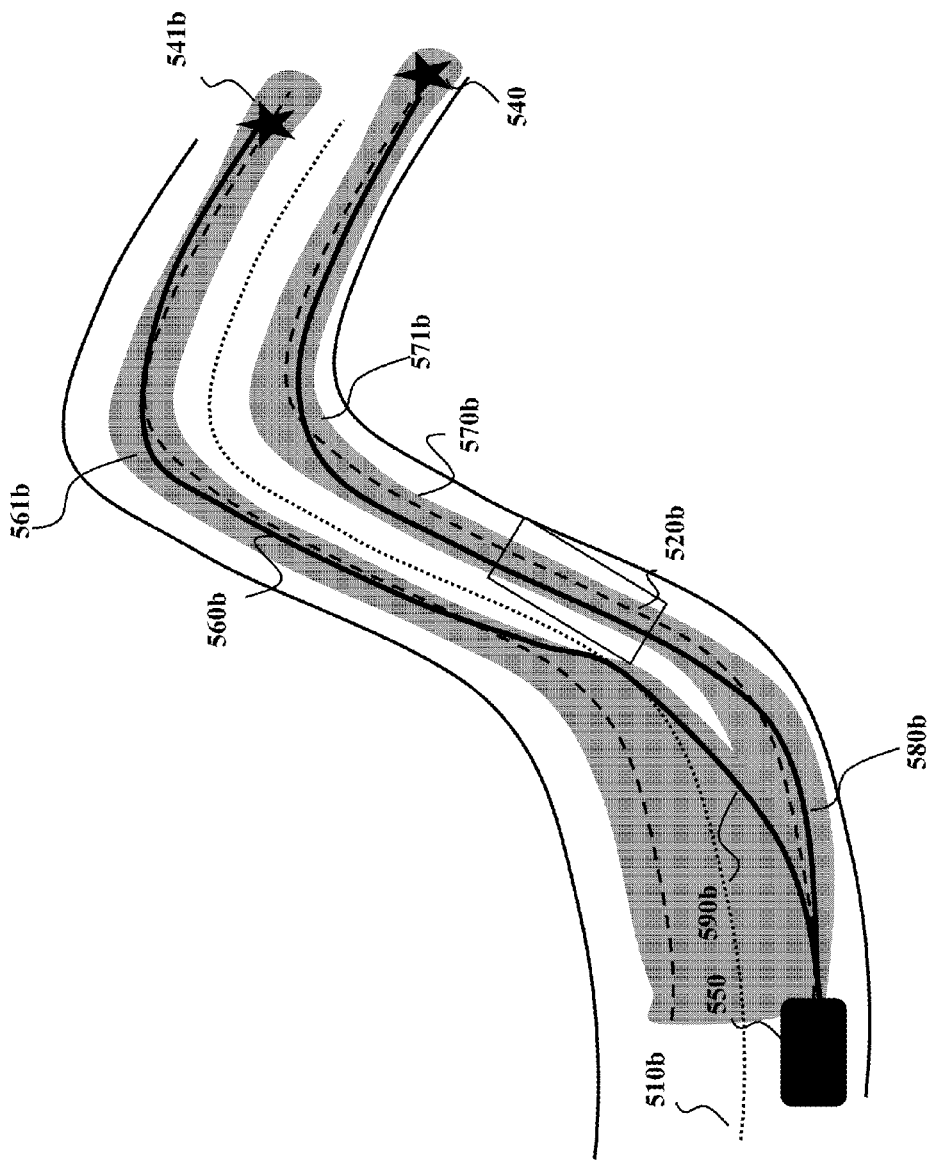
FIG. 5B is a schematic of different motions determined according to some principles employed by some embodiments of the invention.

FIG. 5B shows a schematic of different motions determined according to some principles employed by various embodiments of the invention. The autonomous vehicle is at the current state 550 on a two-lane road with lane divider 510b, with a moving obstacle 520b in the first lane. The specification on the motion can be that the vehicle should maintain either of the two lanes 560b and 570b, with the respective tolerated probabilistic deviation 561b and 571b from the specification, so the motion planner can determine to either stay in the first lane or move to the second lane. The black lines 580b and 590b show two possible computed motions by the motion planner 240. The motion 590b is not satisfying the specification 560b until after approximately midway through the path.

FIG. 5C shows the respective velocity profiles 580c and 590c corresponding to 580b and 590b, together with the specification 560c of maintaining a nominal, in this case constant, velocity. In FIG. 5C, the velocity 580c corresponding to the motion 580b is not satisfying the constraint. Some embodiments of the invention weigh these two and additional specifications together when determining the best motion.

Figure 5D:
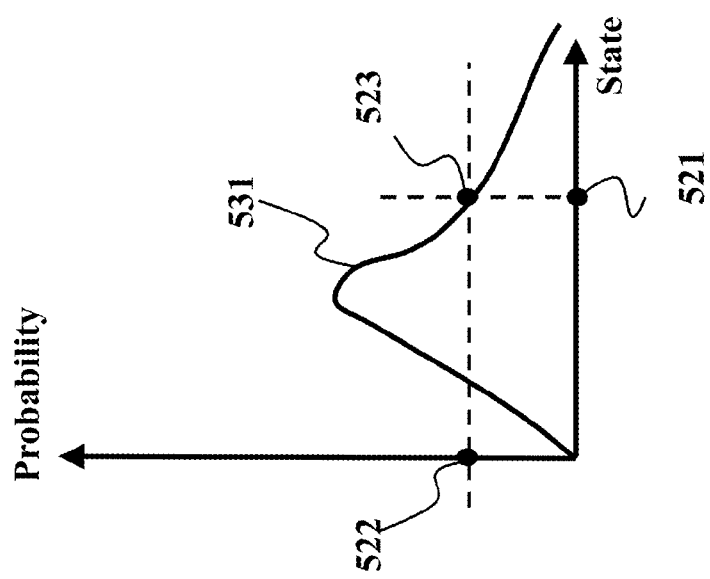
FIG. 5D shows a graph illustrating selection of the probability of the sampled control inputs according to one embodiment of the invention.

FIG. 5D shows a graph illustrating selection of the probability of the sampled control inputs using the PDF 531 over states of the vehicle according to one embodiment of the invention. For example, the embodiment submits the initial state and the sampled control input to the model of the motion of the vehicle to estimate a transition of the vehicle from the initial state to a next state 521 and selects a value 522 of the PDF over states of the vehicle at a point 523 corresponding to the next state 521 as the probability of the sampled control input.

Figure 6A:
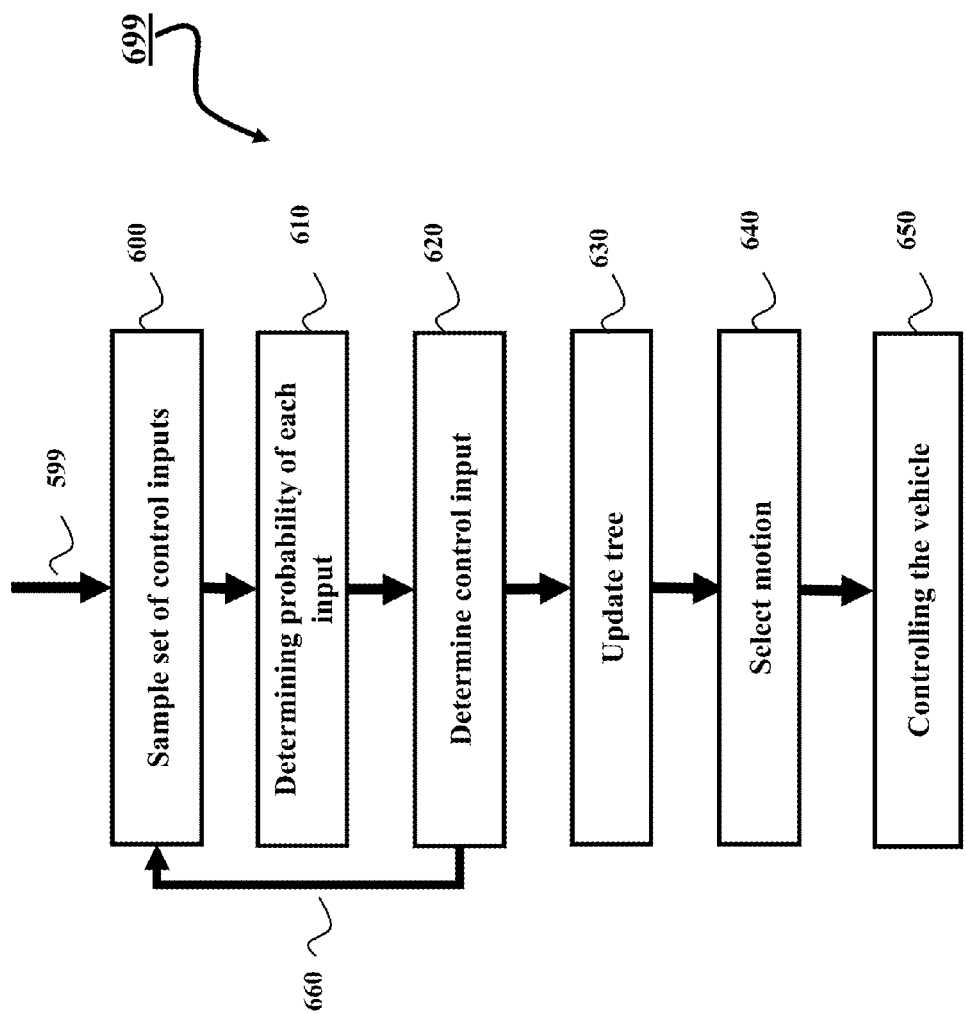
FIG. 6A is a flowchart of a method for controlling a vehicle according to some embodiments of the invention.

FIG. 6A shows a flowchart of a method 699 for controlling the vehicle according to some embodiments of the invention. The method determines iteratively a sequence of control inputs specifying the motion of the vehicle from an initial state of the vehicle to a target state of the vehicle. In different embodiments, the initial state is a current state of the vehicle and/or wherein the initial state is the state corresponding to the control input determined during a previous iteration of the method. The current and the target state of the vehicle can be determined by the navigation system 220.

The motion is defined by the state transitions connecting states of the vehicle, for example, as shown in FIG. 3. Each state includes a location, a velocity, and a heading of the vehicle. Steps of the method are performed by a processor 270 of the motion-planning system 240 and/or of the vehicle. The motion is determined iteratively until a termination condition is met, for example, for a time period or for a predetermined number of iterations. An iteration of the method of FIG. 6A includes the following steps.

The method determines 600 an initial state, a set of sampled control inputs and a corresponding set of state transitions such that the state and transition satisfy static and dynamic constraints on the state of the vehicle. For example, the method determines the state 380, the state transition 381, and the state 360 in FIG. 3.

Figure 6B:
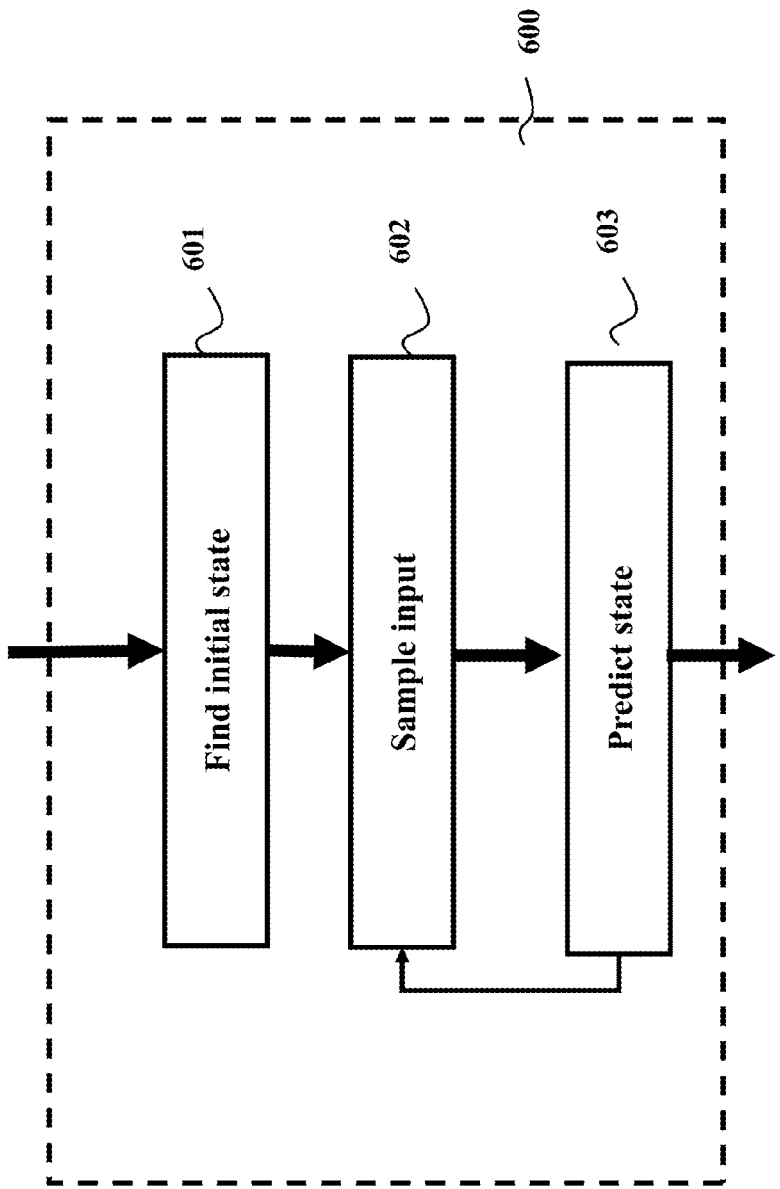
FIG. 6B is a flowchart of an exemplar implementation of the determining the sample set of the control inputs for the method of FIG. 6A according to one embodiment of the invention.

FIG. 6B shows a flowchart of an exemplar implementation of the determining the set of sampled control inputs 600 according to one embodiment of the invention. The determining 600 uses information about the environment and states determined using previous iterations. Examples of the previous states include the nodes 320, 380, 370, and 390 in FIG. 3.

The exemplar implementation performs initial finding of a state 601. If it is the first iteration of the method, the initial state is the current state of the vehicle. Otherwise, the initial state can be determined in many ways. For example, the initial state can be determined as the state with the smallest Euclidean distance to the position of the target state, the initial state can be determined by generating a uniform integer random number between [1, M], where the initial state is number 1 and the last state determined in the previous iteration is number M, or the initial state can be determined as the state corresponding to the control input determined during the previous iteration.

The method samples 602 a set of N control inputs, where N can be predetermined or made adaptive, and predicts 603 the state $$\{x_k^j\}_{i=1}^N$$

using the set of control inputs. In some embodiments of the invention, the control inputs are generated from the noise source of the dynamical system, that is, from $w_k$, with the nominal input $u_k$ as the mean value of the input. For example, $w_k$ can be chosen as arising from a Gaussian distribution $w_k \sim N(u_k, Q_k)$, or it can be chosen as a PDF tailored to the particular application.

In other embodiments of the invention, the sampled control inputs 602 are generated by using the specifications on the motion. The specifications on the motion are known beforehand, and the inputs generated from the noise source of the dynamical system are corrected to better satisfy the specifications. For example, a probabilistic function $$q(x_{k+1} | x_k, y_{k+1})$$

can be used to generate inputs, where q is a function of the state at time index k+1, given the state at the time index k and the specification at time index k+1.

As a particular example, if both $w_k$ and $e_k$ are additive, Gaussian PDFs, q can be chosen as $$q(x_{k+1} | x_k^j, y_{k+1}) = p(x_{k+1} | x_k^j, y_{k+1}) = \mathcal{N}(x_{k+1} | x_{k+1}^j, (\Sigma)_{k+1}^{-1}), \text{ where}$$

$$x_{k+1}^j = f(x_k^j) + w_k^j + L_k^j(y_{k+1} - H_k^j f(x_k^j)), \sum_{k+1}^{i} = ((H_k^j)^T R_{k+1}^{-1}(H_k^j) + Q_k^{-1})^{-1},$$

and $$L_k^j = (Q_k(H_k^j)^T (H_k^j Q_k (H_k^j)^T + R_{k+1}^{-1})^{-1}, H_k^j = \frac{\partial h}{\partial x},$$

that is, the control input can be generated as a random sample from the noise source of the dynamical system, modified with a deterministic term to account for the deviation from the specification, and the corresponding state is predicted 603 using this modified control input.

In one embodiment of the invention, the generation of the sampled control inputs 602 and prediction of corresponding state 603 is executed in a loop, where the number if iterations is determined beforehand. In another embodiment, the generation of control inputs 602 is done based on the specifications T time steps ahead in time. For example, the number of iterations T can be determined as a fixed number of steps, or the iterations can be determined as a function of the resolution of the sensors of the sensing system 230. When 602 is executed T time steps, the inputs are generated according to all specifications from time index k+1 to time index k+T, that is, $$q(x_{k+1} | x_k, y_{k+1}, \ldots, y_{k+T}).$$

Figure 6C:
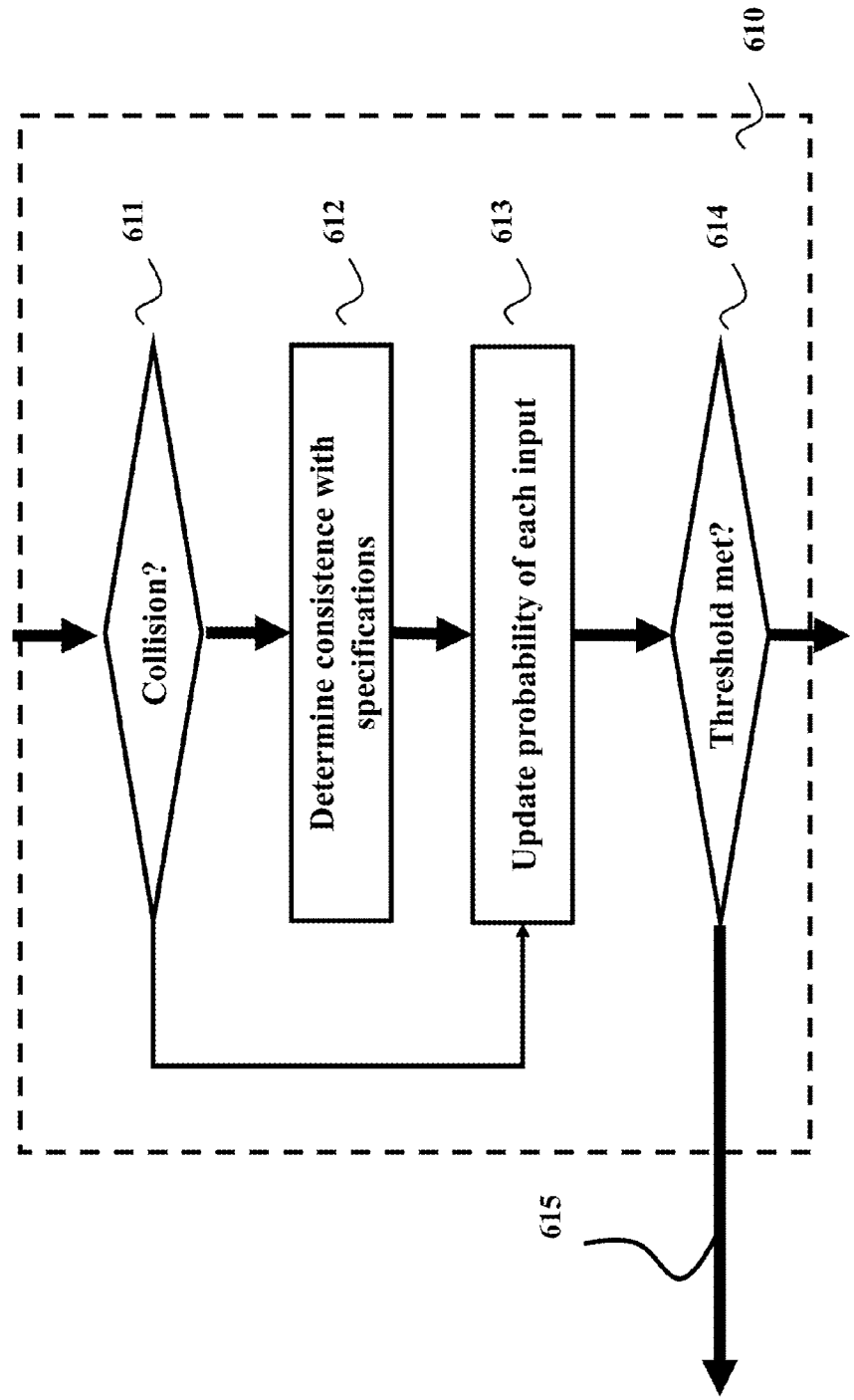
FIG. 6C is a flowchart of an exemplar implementation of the determining the probability of each control input for the method of FIG. 6A according to one embodiment of the invention.

FIG. 6C shows a flowchart of the method 610 that determines the probability of each input producing movement to a state satisfying the constraints on the motion of the vehicle. When determining the probability of each input, the next state 603 is first checked for collision 611. If the next state 603 and the state transition leading up to the state 603 is collision free, consistence of the state with the specification is determined 612 and the probability of each input is computed 613.

In one embodiment, if the collision check 611 determines that the next state $x_{k+1}^i$ collides with an obstacle, the probability of the input leading to a state satisfying the constraints on the motion of the vehicle can be set to zero. The collision check can be deterministic, or it can be probabilistic, where a collision can be assumed to happen if the probability of a collision is above some threshold, where the prediction of obstacles is done according to a probabilistic motion model of the obstacle.

Figure 6D:
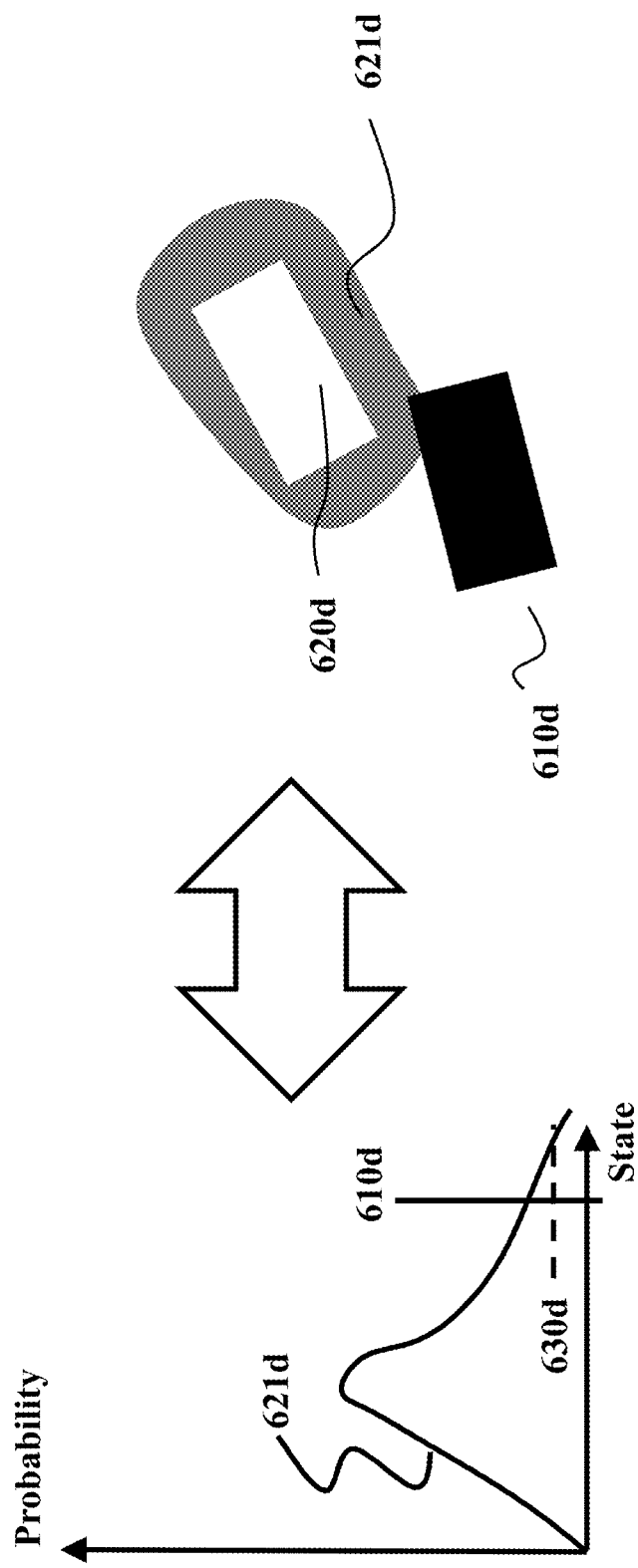
FIG. 6D is a schematic of the determining the probability of collision according to some embodiments of the invention.

FIG. 6D shows an example where the prediction of the location 610*d* of the autonomous vehicle intersects with the uncertainty region 621*d* of the obstacle 620*d*, and where the probability of the obstacle 620*d* being at the location 610*d* is higher than a collision threshold 630*d*. For example, a sensor of the vehicle can determine a position of an obstacle as a function of time. The motion-planning system determines a probability of the next state to intersect with an uncertainty region of the obstacle and assigns a zero probability to the sampled control input when the probability of the next state to intersect with the uncertainty region of the obstacle is above a collision threshold.

In another embodiment of the method 610, if the aggregated probability is below a threshold 614, where the threshold can be predetermined, no inputs have a large probability of leading to a state satisfying the constraints on the motion of the vehicle, so the method exits 615 and restarts 599.

In some embodiments of the invention, the determining 612 is done as a combination of the PDF of the specifications/constraints, $$p(y_{k+1} \mid x_{k+1}^i),$$

the next state, and the probability $\omega_k^i$ of the input determined during the previous cycle 660. For example, if inputs are generated according to the dynamic model of the vehicle, the probabilities are proportional to the PDF of the specifications, that is, $$\omega_{k+1}^i \propto p(y_{k+1} \mid x_{k+1}^i)\omega_k^i.$$

As another example, if the sampling of inputs is done according to $$p(x_{k+1} \mid x_k^i, y_{k+1}),$$

as explained above, the probabilities are proportional to the prediction of the PDF of the specifications, that is, $$\omega_{k+1}^i \propto p(y_{k+1} \mid x_k^i)\omega_k^i.$$

In one embodiment, the probabilities are normalized in such a way that they represent a PDF.

In one embodiment of the invention, inputs and corresponding states with nonzero but low probability are in some time steps replaced with inputs and states with higher probabilities. For example, one embodiment generates a new set of inputs and corresponding states in such a way that the probability of generating $x_k^i$ is $w_k^i$. In another embodiment, the replacement is performed whenever the inverse square sum of the probabilities is below some predefined threshold. Doing in such a manner ensures that only probably good control inputs are used.

The determining 620 of the input and corresponding state can be done in several ways. For example, one embodiment determines control input by using a weighted average function to produce the state as $x_{k+1} = \Sigma_{i=1}^N \omega_{k+1}^i x_{k+1}^i$ and similar for the control input. Another embodiment determines control input as the state and input with highest probability, that is, i=argmax $\omega_{k+1}^i$. Additionally or alternatively, one embodiment determines the control input by averaging over a fixed number m<N of sampled control inputs.

Figure 6E:
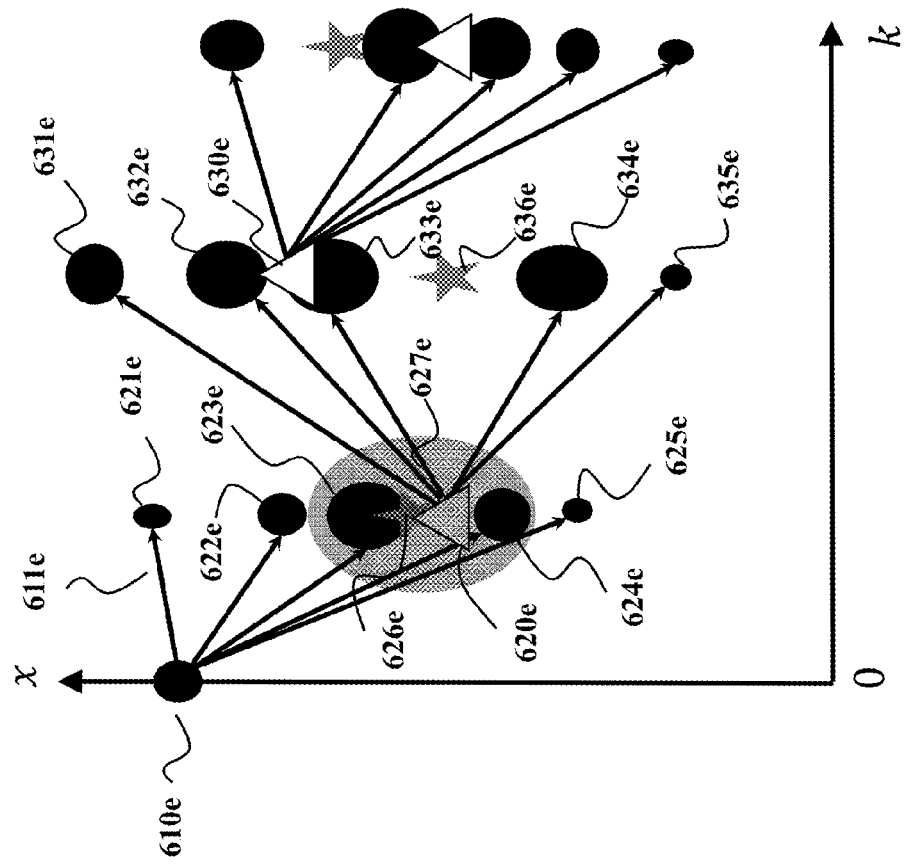
FIG. 6E is a schematic of the determining the next states, control inputs, and corresponding aggregates according to some principles employed by some embodiments of the invention.

FIG. 6E shows a simplified schematic of the result of three iterations of steps 600, 610 and 620 when five sampled control inputs are generated for each iteration. The initial state 610*e* is predicted forward in time 611*e* using the model of the motion and the five sampled control inputs to produce five next states 621*e*, 622*e*, 623*e*, 624*e*, and 525*e*. The probabilities are determined as a function of the specification 626*e* and the probabilistically allowed deviation 627*e* of the specification 626*e*. At each time step, i.e., at each iteration, an aggregate of the probabilities is used to produce an aggregated control input and corresponding state 620*e*.

Figure 6F:
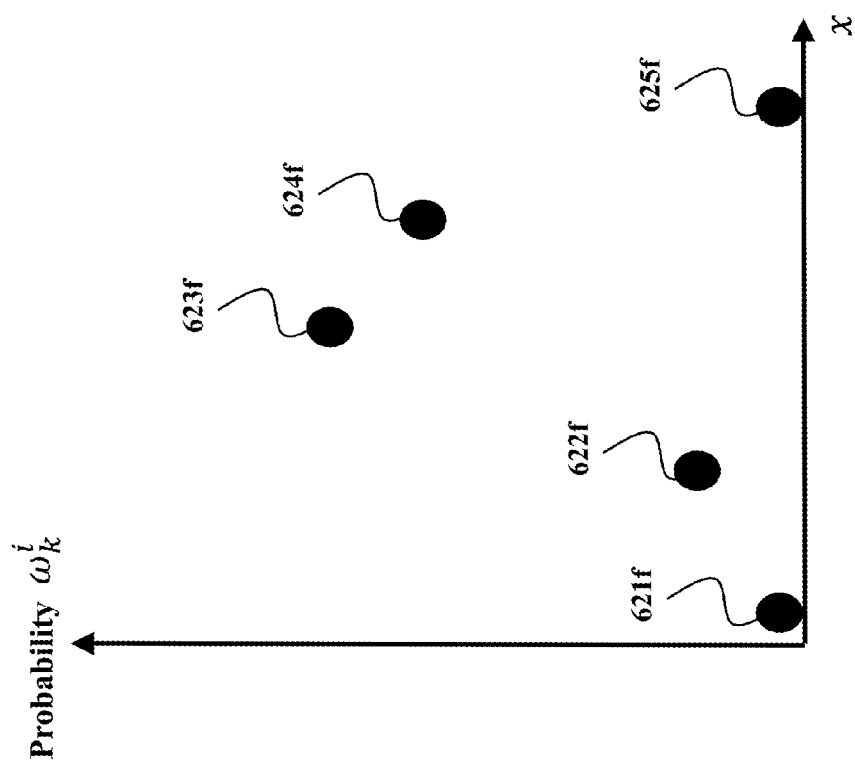
FIG. 6F is a schematic of the determining the probabilities of the states and corresponding control inputs, and corresponding aggregates according to some principles employed by some embodiments of the invention.

FIG. 6F shows possible assigned probabilities of the five states at the first iteration in FIG. 6E. Those probabilities 621*f*, 622*f*, 623*f*, 624*f*, and 525*f* are reflected in selecting the sizes of the dots illustrating the states 621*e*, 622*e*, 623*e*, 624*e*, and 525*e*.

Referring back to FIG. 6E, the state 620*e* becomes the initial state for the next iteration that again produces five sampled control input transitioning the state of the vehicle from the initial state 620*e* to next states 631*e*, 632*e*, 633*e*, 634*e*, and 635*e*. The control input corresponding to the state 630*e* is selected according the probabilities of the sampled control inputs of this iteration. The state 630*e* is the initial state for the next iteration.

In some embodiments of the invention, constraints, such as those in FIG. 4, can counteract each other. For example, consider the constraint that a vehicle that drives on a two-lane road should maintain the middle of one of the lanes. This can be expressed as a specification y=d², where d can be the absolute value of the displacement of the vehicle from the middle of the road, that is, the value of y will be the same irrespective of whether the vehicle is in the first lane or the second lane.

Figure 6G:
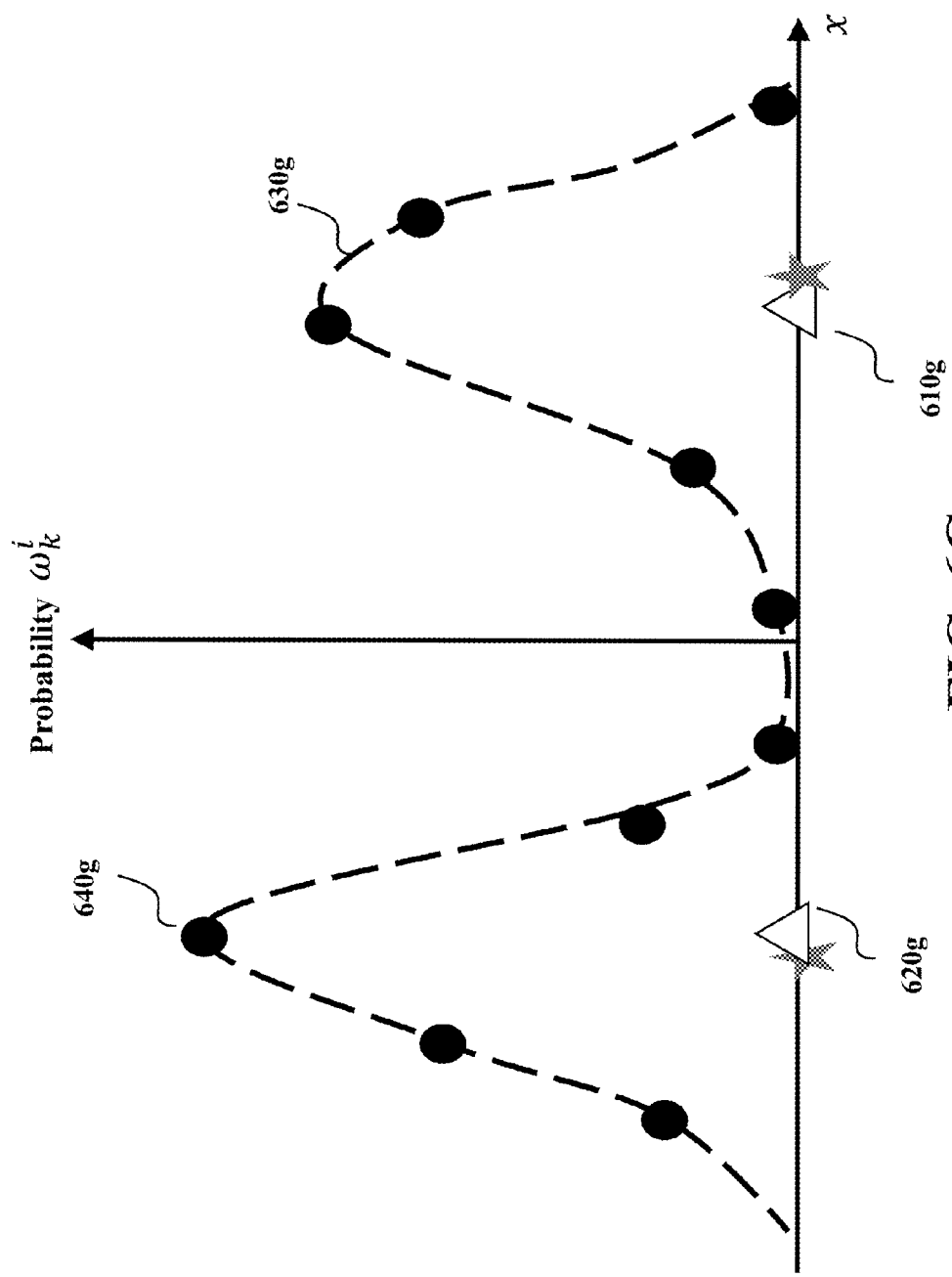
FIG. 6G is a schematic of the determining the aggregated states when there are specifications leading to distinct sets of states, according to some embodiments of the invention.

FIG. 6G shows a schematic of a possible scenario for conflicting constraints according to one embodiment of the invention. The embodiment first determines which states belong to which of the lanes, then compute two aggregated control inputs and corresponding aggregated states. This can be done in several ways. For example, one embodiment first determines a continuous representation 630*g* of the discrete probabilities, for example using a kernel smoother, then determine 610*g* and 620*g*, exemplified by 560*b* and 570*b* in FIG. 5B. In another embodiment, the control input and corresponding state corresponding to the largest probability 640*g* is determined. In another embodiment, two near-lying states with probabilities below some threshold determine the lane divider. It is to be understood that this example can be generalized to other specifications and to higher dimensions. As an alternative, the conflicting constraints can be treated separately by first determine a motion for the first constraint including the other, nonconflicting constraints, then for the other.

Some embodiments update a tree G=(V, E) of nodes and edges as follows. If it is the first iteration of the method 600, the tree is initialized with the current state and the edges are empty. Otherwise, the sequence of aggregated states and sequence of control inputs determined in 600-620 are added as nodes and the trajectories connecting the states are added as edges. For example, 360 in FIG. 3 is an added node and the corresponding edge is 381. Alternatively, in one embodiment all generated control inputs and corresponding states are added to the tree, in which case the determining 620 can be circumvented.

FIG. 6H shows a simplified schematic of iteration of the method producing one control for each discrete section of the PDF. In this example, two the control inputs corresponding to the states 623e and 624e are selected for a single iteration. Selection of multiple control inputs for at least one iteration results in the set of motions connecting the current state of the vehicle with the target state of the vehicle. To that end, one embodiment selects from the set of motions the motion optimizing a cost function.

Figure 6I:
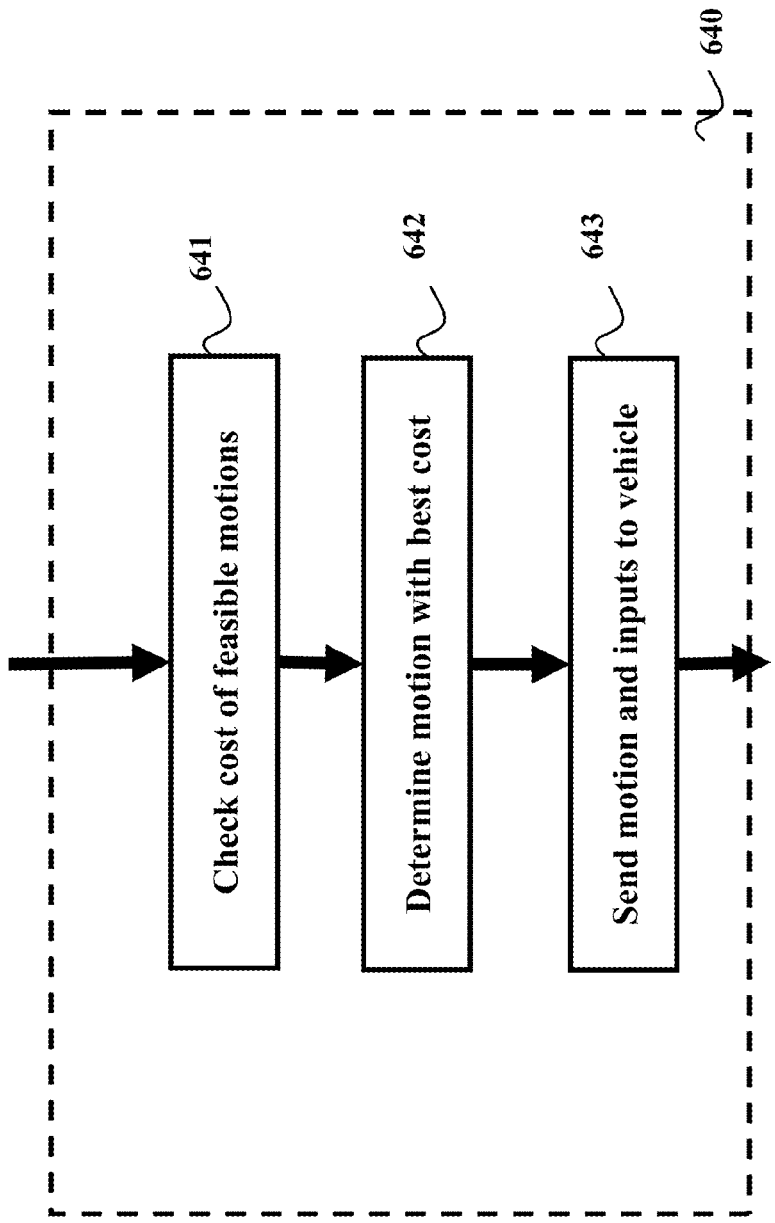
FIG. 6I is a flowchart of an exemplar implementation of the determining the selecting motion for the vehicle according to one embodiment of the invention.

FIG. 6I shows a block diagram for selecting motion 640 of the vehicle according to one embodiment. All motions that have reached the target region 340 are checked according to their cost function, the motion resulting in best cost is determined 642, and the motion with corresponding control inputs are applied 643 to the vehicle-control system.

Some embodiments controls 650 the vehicle according to the motion computed by the motion-planning system 240. The motion computed by the motion-planning system is used as a reference trajectory to the control system of the vehicle. In one embodiment, the control inputs are used as feedforward components to the vehicle-control system. For example, one embodiment of the invention uses reference trajectories in the form of Cartesian planar locations and uses steering angle and acceleration of the vehicle as feedforward components. In one embodiment, the reference trajectory contains position, velocity vector, and heading of the vehicle.

Figure 7:
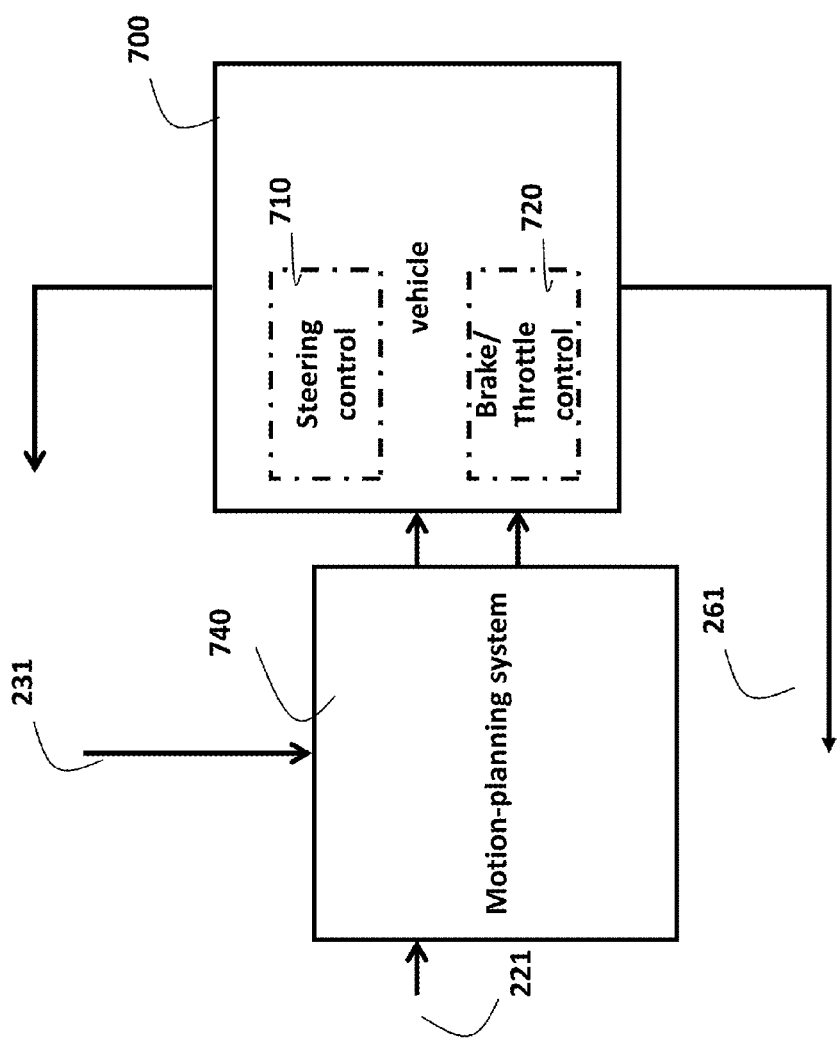
FIG. 7 is a schematic of interaction between the motion planning system and a vehicles controller according to some embodiments of the invention.

FIG. 7 shows a schematic of interaction between the motion planning system and the vehicle controller according to some embodiments of the invention. For example, in some embodiments of the invention, the controllers of the vehicle 700 are steering 710 and brake/throttle controllers 720 that control rotation and acceleration of the vehicle 700. However, in one embodiment the motion-planning system 740 uses a simpler model, such that the control inputs in the motion planner 740 are steering and velocity. To that end, a vehicle controller 700 maps the control input to a control command to at least one actuator of the vehicle, such a the steering wheel and/or the brakes of the vehicle, and controls the motion of the vehicle using the control command to the actuator of the vehicle.

For example, the control input of the motion planner can be added to the reference trajectory of the vehicle-control system 720. In one embodiment, the control inputs computed in the motion planner to move the vehicle, are used as feedforward control inputs to the true vehicle-control system, for example, when the control inputs of the motion-planning system 740 are partly the same as 710 and 720. Doing in such a manner, the true vehicle-control system only controls deviation due to modeling errors in the motion planner.

The motion-planning system 240 selects a motion subject to minimizing a cost function $J(x, u, \sigma_y) = j(x(T), u(T), \sigma_y(T)) + \int_0^T g(x(t), u(t), \sigma_y(t))dt$ and satisfying constraints on the movement of the vehicle and avoiding collision with obstacles. One embodiment chooses the cost function as $$J = \int_o^T k_1 \|p - p_{ref}\| + k_1 \|v - v_{ref}\| dt,$$

where $k_1$ and $k_1$ are positive weights on the Euclidean distances, $p_{ref}$ and $v_{ref}$ are desired path and velocity, respectively, coining from a navigation system, computed, for example, from driver or passenger inputs, or estimated from cameras, and p and v are position and velocity of the vehicle. In other embodiments, the cost function is chosen as J=T, where T is the time of the motion to reach the target region from initial state. Yet another embodiment uses $g=k_1 \Delta \delta + k_2 \Delta v$, where $\Delta \delta$ and $\Delta v$ are the differences in steering and velocity between two consecutive time steps, respectively, and vice versa. For example, one embodiment inserts intermediate target outputs between the current location and the target state.

Figure 8:
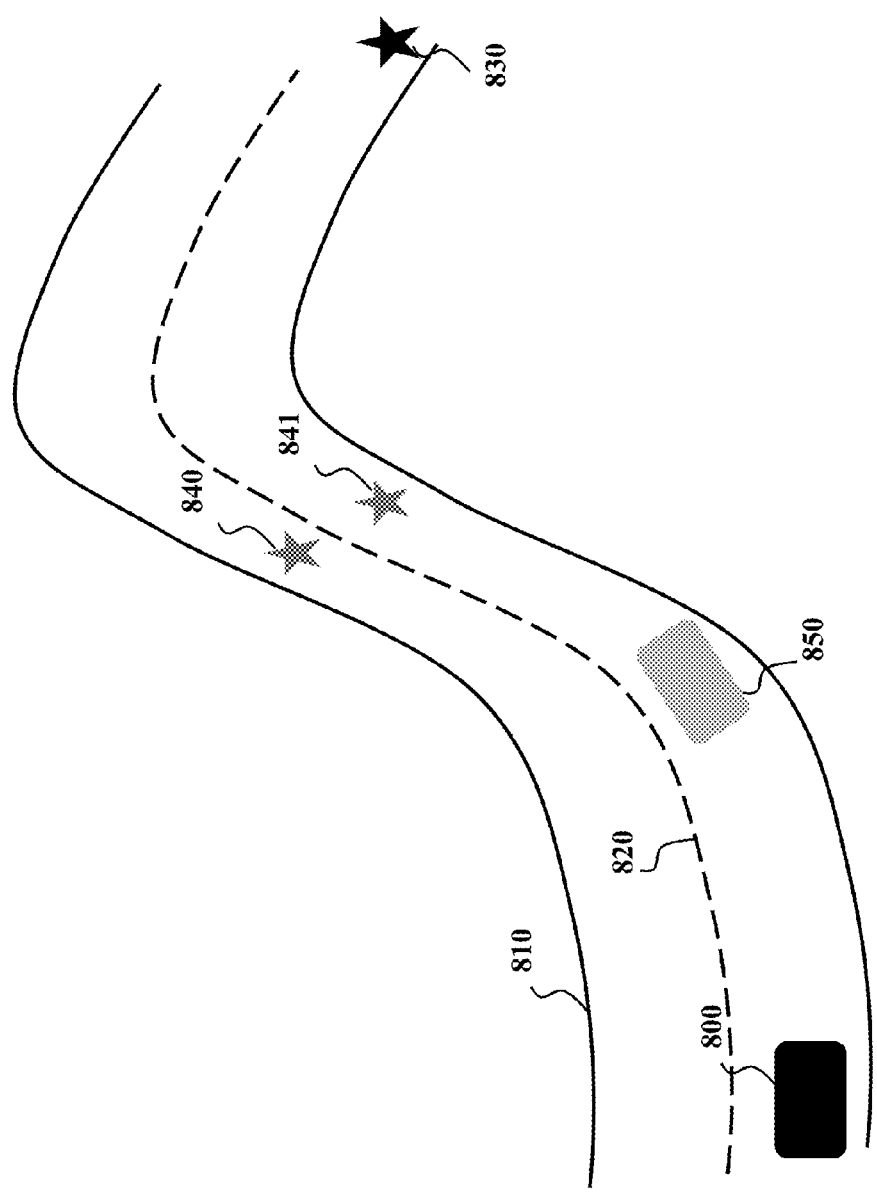
FIG. 8 is a schematic of an insertion of intermediate target position according to one embodiment of the invention.

FIG. 8 shows a situation where the autonomous vehicle 800 moves on a two-lane road with road edges 810 and divider 820 between the two lanes, has received a target location 830, but the motion-planning system cannot compute a safe motion to the target 830 within the allocated time slot. In one embodiment of the invention, the motion planner inserts intermediate target points 840 and/or 841, which are easier to reach. In one embodiment, one target point in each lane is inserted. For example, when there is an obstacle 850 on the road, depending on the cost function used, the motion planner can determine whether or not overtaking of the vehicle 850 is initiated. In another embodiment, the navigation system can provide such intermediate targets.

For example, one embodiment determines an intermediate target location, for example, the location 840 between the initial location and the target location, determines a first motion between the initial location and the intermediate target location, and controls the vehicle to reach the intermediate target location using the first motion. Next, the embodiment determines a second motion between the intermediate target location and the target location and controls the vehicle to reach the target location using the second motion. Alternatively, several motions 560b and 570b as in FIG. 5B can be computed.

In some embodiments, when the time slot for computation has expired, the computed motion to the intermediate target is sent to the vehicle-control system as a reference, while the motion-planning system continues to compute an improved motion to the target state 830. In some embodiments, the intermediate targets are updated as new predicted motions are sent to the vehicle-control system. In other embodiments, the parts of the tree that are not executed are removed before improving the motion, to increase efficiency.

Some embodiments determine the target location as the furthest location the motion-planning system can process. For example, one embodiment determines a period of time allowed for determining the motion, determines a maximal distance allowing to compute the motion within the period of time, and determines a location at the maximal distance from the initial location toward a final destination as the target location, depending on several factors, such as maximum acceleration, maximum velocity, and maximum steering.

Figure 9:
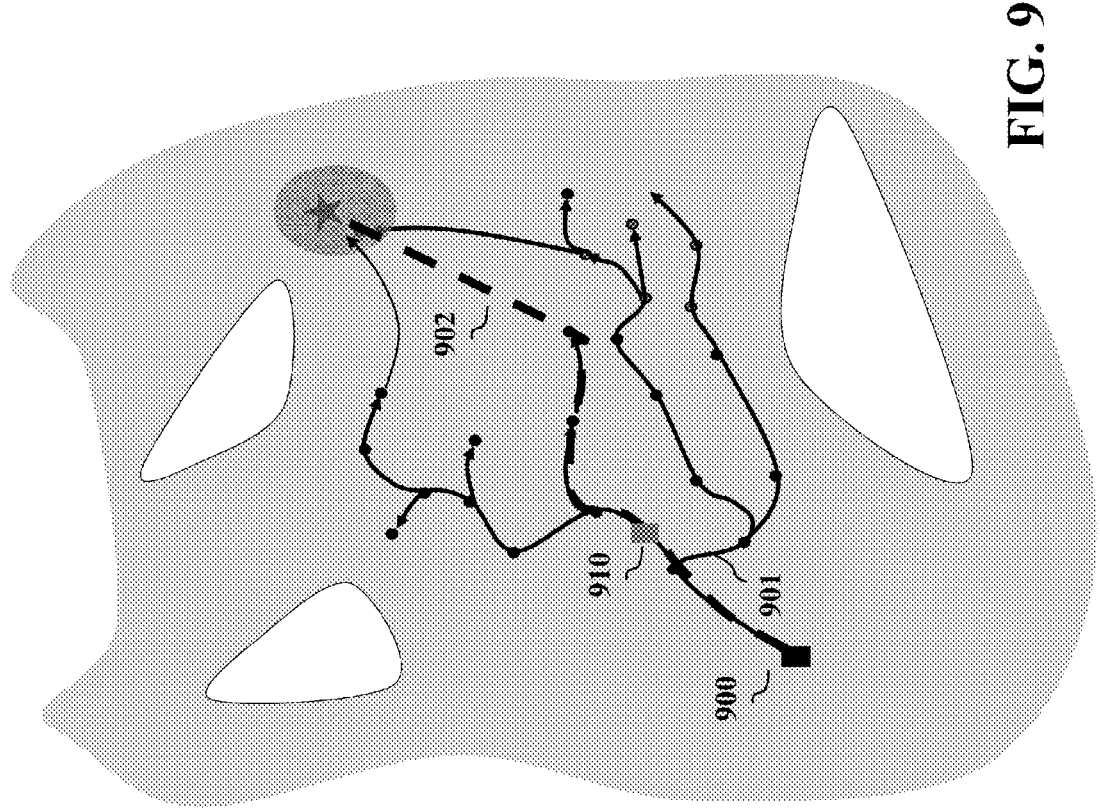
FIG. 9 is a schematic of the motion submitted to the vehicle controller for moving the vehicle according to one embodiment of the invention.

FIG. 9 shows a schematic of the motion 902 submitted to the vehicle controller for moving the vehicle 900. At the next planning cycle, the vehicle has moved to 910. In one embodiment of the invention, the motion planner predicts this and removes the nodes and edges in the graphs corresponding to redundant parts 901.

When a previously computed motion is available, the motion-planning system can use that motion to reduce the number of computations. However, the path can need to be adjusted for accounting for changes in the nondrivable area, due for instance to one or more obstacles that moved differently than what was predicted by the prediction system 243, even if uncertainty prediction is included in 243, and for that the controlled vehicle position is not exactly the same as computed by the motion-planning system 240.

Figure 10:
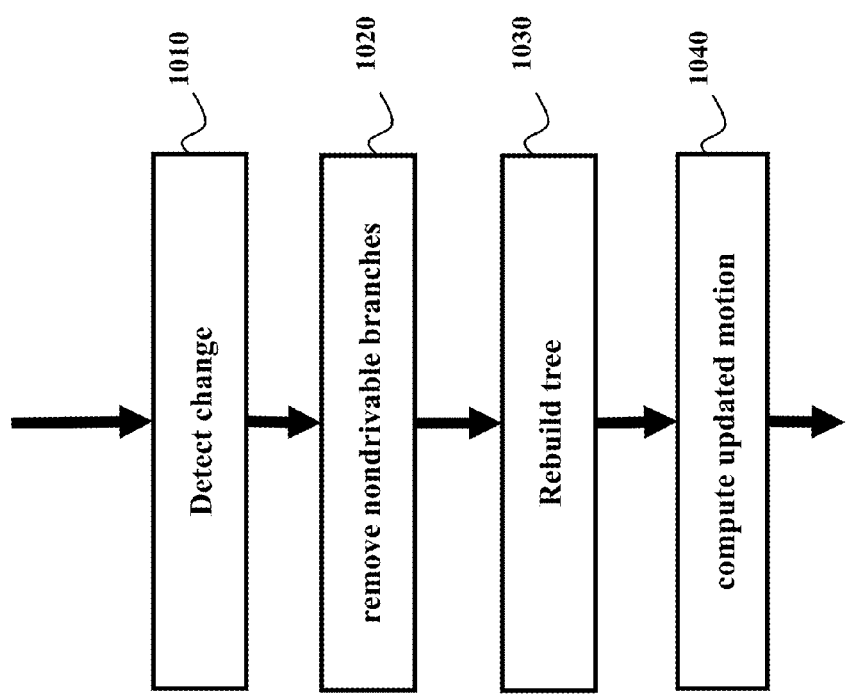
FIG. 10 is a flowchart of a method for updating the motion according to one embodiment of the invention.

FIG. 10 shows a flowchart of a method for updating the motion according to one embodiment of the invention. First, the sensing system detects unexpected changes 1010 in the environment or changes in the estimate of the vehicle state. Branches corresponding to nodes leading to unsafe motions are removed 1020. Potential areas that were uncovered previously are sampled, together with additional sampling and connections of locations as time permits 1030, and the motion is updated 1040.

In some embodiments, when a new obstacle appears or an obstacle changes position relative to what was predicted in the motion planner, first the edges in the tree that collide with the new predicted obstacle motion are determined. For each edge that intersects with obstacles, the corresponding child endpoint node is marked as invalid. Next, the tree is trimmed and regrown.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a motion of a vehicle, comprising:
sampling a control space of possible control inputs to a model of the motion of the vehicle to produce a set of sampled control inputs, wherein the model of the motion of the vehicle includes an uncertainty;
determining, using the model of the motion of the vehicle, a probability of each sampled control input to move the vehicle into a state satisfying constraints on the motion of the vehicle, comprising:
determining an initial state of the vehicle;
submitting the initial state and the sampled control input to the model of the motion of the vehicle to estimate a transition of the vehicle from the initial state to a next state;
selecting a value of a probability distribution function (PDF) over states of the vehicle at a point corresponding to the next state as the probability of the sampled control input;
determining a probability of the next state to intersect with an uncertainty region of an obstacle; and
assigning a zero probability to the sampled control input when the probability of the next state is above a collision threshold;
determining, using the probabilities of the sampled control inputs, a control input having the probability to move the vehicle in the state above a threshold;
mapping the control input to a control command to at least one actuator of the vehicle; and
controlling the motion of the vehicle according to the control command, wherein steps of the method are performed using a processor of the vehicle.

2. The method of claim 1, wherein the model of the motion of the vehicle is a function describing transitions of states of the vehicle, wherein the function includes noise acting on the state, wherein the state includes a location of the vehicle, a velocity of the vehicle and a heading of the vehicle, and wherein the noise acting on the state includes the uncertainty formed by one or combination of an uncertainty on accuracy of a dynamics of the vehicle described by the function and an uncertainty on accuracy of parameters of the vehicle used by the function.

3. The method of claim 1, wherein the determining the control input comprises:
aggregating the sampled control inputs having the probability above the threshold using a weighted average function to produce the control input, wherein a weight for each sampled control input in the weighted average function is its corresponding probability.

4. The method of claim 1, wherein the determining the control input comprises:
selecting a sampled control input having the highest probability among the probabilities of the sampled control inputs above the threshold as the control input.

5. The method of claim 1, wherein the constraints on the motion of the vehicle include one or combination of a bound on a deviation of a location of the vehicle from a middle of a road, a bound on a change from a current acceleration and a heading angle of the vehicle, a bound on a deviation from a desired velocity profile of the vehicle, and a bound on a minimal distance to an obstacle on the road.

6. The method of claim 1, wherein the constraints on the motion of the vehicle include one or combination of a probability of a deviation of a location of the vehicle from a middle of a road, a probability of a deviation from a current acceleration and a heading angle of the vehicle, a probability on a deviation from a desired velocity profile of the vehicle, and a probability on violating a minimal distance to an obstacle on the road.

7. The method of claim 1, further comprising:
determining the PDF using the constraints on the motion of the vehicle and the uncertainty of the model of the motion of the vehicle.

8. The method of claim 1, wherein the initial state is a current state of the vehicle.

9. The method of claim 1, further comprising:
determining iteratively a sequence of control inputs specifying the motion of the vehicle from the initial state of the vehicle to a target state of the vehicle, wherein the initial state is the state corresponding to the control input determined during a previous iteration of the method.

10. The method of claim 9, wherein the PDF is determined for each iteration of the method, and wherein the PDF for at least one iteration includes multiple discrete sections with values above the threshold, the iteration comprising:
determining a set of control inputs, wherein there is one control for each discrete section of the PDF to produce the set of motions connecting the current state of the vehicle with the target state of the vehicle; and
selecting from the set of motions the motion optimizing a cost function.

11. The method of claim 9, further comprising:
determining the target state based on an objective of the motion and a computational power of the processor.

12. A control system of a vehicle, comprising:
a motion-planning system including a processor and a memory storing a model of the motion of the vehicle that includes an uncertainty of the motion and constraints on the motion of the vehicle, wherein the motion-planning system samples a control space of possible control inputs to the model of the motion of the vehicle to produce a set of sampled control inputs;
determines, using the model of the motion of the vehicle, a probability of each sampled control input to move the vehicle into a state satisfying constraints on the motion of the vehicle; and
determines, using the probabilities of the sampled control inputs, a control input having the probability above a threshold,
wherein the motion-planning system determines the probability of the sampled control input by selecting a value of a probability distribution function (PDF) over states of the vehicle as the probability of the sampled control input at a point corresponding to a next state transitioned from an initial state according to the sampled control input;
a sensor to determine a position of an obstacle as a function of time, wherein the motion-planning system determines a probability of the next state to intersect with an uncertainty region of the obstacle and assigns a zero probability to the sampled control input when the probability of the next state to intersect with the uncertainty region of the obstacle is above a collision threshold; and
a vehicle controller to map the control input to a control command to at least one actuator of the vehicle and to control the motion of the vehicle using the control command to the actuator of the vehicle.

13. The control system of claim 12, wherein the model of the motion of the vehicle is a function describing transitions of states of the vehicle, wherein the function includes noise acting on the state, wherein the state includes a location of the vehicle, a velocity of the vehicle and a heading of the vehicle, and wherein the noise acting on the state includes the uncertainty formed by one or combination of an uncertainty on accuracy of a dynamics of the vehicle described by the function and an uncertainty on accuracy of parameters of the vehicle used by the function.

14. The control system of claim 12, wherein the motion-planning system aggregates the sampled control inputs having the probability above the threshold using a weighted average function to produce the control input, wherein a weight for each sampled control input in the weighted average function is its corresponding probability.

15. The control system of claim 12, wherein the constraints on the motion of the vehicle include one or combination of a probability of a deviation of a location of the vehicle from a middle of a road, a probability of a deviation from a current acceleration and a heading angle of the vehicle, a probability on a deviation from a desired velocity profile of the vehicle, a probability on violating a minimal distance to an obstacle on the road.

16. The control system of claim 12, further comprising:
a navigation system to determine a current state of the vehicle and a target state of the vehicle, wherein the motion-planning system determines iteratively a sequence of control inputs specifying the motion of the vehicle from the current state of the vehicle to the target state of the vehicle, wherein the initial state is the current state or the state corresponding to the control input determined during a previous iteration of the method.

* * * * *